United States Patent [19]
Beall et al.

[11] Patent Number: 6,083,559
[45] Date of Patent: Jul. 4, 2000

[54] INTERCALATES AND EXFOLIATES FORMED WITH HYDROXYL-FUNCTIONAL; POLYHYDROXYL-FUNCTIONAL; AND AROMATIC COMPOUNDS; COMPOSITE MATERIALS CONTAINING SAME AND METHODS OF MODIFYING RHEOLOGY THEREWITH

[75] Inventors: Gary W. Beall, McHenry; Semeon Tsipursky, Lincolnwood; Anatoliy Sorokin, Wheeling; Anatoliy Goldman, Palatine, all of Ill.

[73] Assignee: Amcol International Corporation, Arlington Heights, Ill.

[21] Appl. No.: 09/158,491

[22] Filed: Sep. 22, 1998

Related U.S. Application Data

[63] Continuation of application No. 08/654,648, May 29, 1996, Pat. No. 5,830,528.

[51] Int. Cl.$^7$ ................................................. C08K 3/34
[52] U.S. Cl. ........................... 427/220; 106/416; 106/417; 106/483; 106/484; 106/487; 252/315.2; 501/141; 501/145; 501/148
[58] Field of Search ..................... 106/416, 417, 106/483, 484, 487; 252/315.2; 501/141, 145, 148; 427/220

[56] References Cited

U.S. PATENT DOCUMENTS

| | | | |
|---|---|---|---|
| 2,035,546 | 3/1936 | Hamilton | 167/24 |
| 3,419,460 | 12/1968 | Ure | 161/162 |
| 3,419,517 | 12/1968 | Hedrick et al. | 260/37 |
| 3,515,626 | 6/1970 | Duffield | 161/162 |
| 3,773,708 | 11/1973 | Takahashi et al. | 260/41 R |
| 3,795,650 | 3/1974 | Burns | 260/33.4 R |
| 3,912,532 | 10/1975 | Simone | 106/308 N |
| 3,929,678 | 12/1975 | Laughlin et al. | 252/526 |
| 4,125,411 | 11/1978 | Lyons | 106/291 |
| 4,210,572 | 7/1980 | Herman et al. | 260/404 |
| 4,251,576 | 2/1981 | Osborn et al. | 428/331 |
| 4,400,485 | 8/1983 | Mukamal et al. | 524/444 |
| 4,431,755 | 2/1984 | Weber et al. | 523/203 |
| 4,434,075 | 2/1984 | Mardis et al. | 252/315.2 |
| 4,472,538 | 9/1984 | Kamigaito et al. | 523/202 |
| 4,500,670 | 2/1985 | McKinley et al. | 524/445 |
| 4,546,145 | 10/1985 | Kishida et al. | 524/780 |
| 4,600,744 | 7/1986 | Libor et al. | 524/446 |
| 4,613,542 | 9/1986 | Alexander | 428/290 |
| 4,624,982 | 11/1986 | Alexander | 524/446 |
| 4,739,007 | 4/1988 | Okada et al. | 524/789 |
| 4,789,403 | 12/1988 | Rice | 106/417 |
| 4,798,766 | 1/1989 | Rice | 428/404 |
| 4,810,734 | 3/1989 | Kawasumi et al. | 523/216 |
| 4,842,651 | 6/1989 | Ravet et al. | 106/487 |
| 4,849,006 | 7/1989 | Knudson, Jr. | 71/64.11 |
| 4,875,762 | 10/1989 | Kato et al. | 350/357 |
| 4,889,885 | 12/1989 | Usuki et al. | 524/443 |
| 4,894,411 | 1/1990 | Okada et al. | 524/710 |
| 4,920,171 | 4/1990 | Hutton, Jr. et al. | 524/446 |
| 4,956,121 | 9/1990 | Tymon et al. | 252/378 R |

(List continued on next page.)

FOREIGN PATENT DOCUMENTS

| | | |
|---|---|---|
| 0 205 281 A3 | 12/1986 | European Pat. Off. . |
| 0 335 653 A1 | 10/1989 | European Pat. Off. . |
| 0 358 415 A1 | 3/1990 | European Pat. Off. . |
| 0 479 031 A1 | 4/1992 | European Pat. Off. . |
| 0 548 940 A1 | 6/1993 | European Pat. Off. . |
| 0 619 182 A1 | 10/1994 | European Pat. Off. . |
| 0 645 181 A2 | 3/1995 | European Pat. Off. . |
| 0 761 739 A1 | 3/1997 | European Pat. Off. . |
| 0 780 340 A1 | 6/1997 | European Pat. Off. . |
| 1 642 122 | 7/1970 | Germany . |
| 281 585 A5 | 8/1990 | Germany . |
| 1 146 668 | 3/1969 | United Kingdom . |
| 1 565 362 | 4/1980 | United Kingdom . |
| 2 088 932 | 6/1982 | United Kingdom . |
| WO 93/04117 | 3/1993 | WIPO . |
| WO 93/04118 | 3/1993 | WIPO . |
| WO 93/11190 | 6/1993 | WIPO . |

OTHER PUBLICATIONS

C. W. Francis, "Adsorption of Polyvinylpryrrolidone on Reference Clay Minerals", Soil Science, vol. 115, No. 1, 1973, pp. 40–54.

A. Usuki, et al., "Synthesis of nylon 6–clay hybrid", J. Mater. Res., vol. 8, No. 5, May 1993, pp. 1179–1184.

Y. Kojima, et al., "Mechanical Properties Of Nylon 6–Clay Hybrid", J. Mater. Res., vol. 8, No. 5, May 1993, pp. 1185–1189.

K. Suzuki, et al., "Preparation Of Delaminated Clay Having A Narrow Micropore Distribution In The Presence Of Hydroxyaluminum Cations and Polyvinyl Alcohol", Clays and Clay Minerals, vol. 36, No. 2, 1988, pp. 147–152.

R. Levy, et al., "Interlayer Adsorption of Polyvinylpyrrolidone On Montmorillonite", Journal of Colloid and Interface Science, vol. 50, No. 3, Mar. 1975, pp. 442–450.

D.J. Greenland, "Adsorption Of Polyvinyl Alcohols By Montmorillonite", Journal of Colloid Science, 18, (1963) pp. 647–664.

(List continued on next page.)

*Primary Examiner*—Ana Woodward
*Attorney, Agent, or Firm*—Marshall, O'Toole, Gerstein, Murray & Borun

[57] ABSTRACT

Intercalates formed by contacting a layered material, e.g., a phyllosilicate, with an intercalant monomer having a hydroxyl and/or an aromatic ring functionality to sorb or intercalate the intercalant monomer between adjacent platelets of the layered material. Sufficient intercalant monomer is sorbed between adjacent platelets to expand the adjacent platelets to a spacing of at least about 5 Å (as measured after water removal to a maximum of 5% by weight water), up to about 100 Å and preferably in the range of about 10–45 Å, so that the intercalate easily can be exfoliated into individual platelets. The intercalated complex can be combined with an organic liquid into a viscous carrier material, for delivery of the carrier material, or for delivery of an active compound; or the intercalated complex can be combined with a matrix polymer to form a strong, filled polymer matrix. Alternatively, the intercalated complex can be exfoliated prior to or after combination with the organic liquid or the matrix polymer.

12 Claims, 5 Drawing Sheets

U.S. PATENT DOCUMENTS

| | | | |
|---|---|---|---|
| 5,028,351 | 7/1991 | Kato et al. | 252/315.2 |
| 5,032,546 | 7/1991 | Giannelis et al. | 501/3 |
| 5,032,547 | 7/1991 | Giannelis et al. | 501/3 |
| 5,091,462 | 2/1992 | Fukui et al. | 524/504 |
| 5,102,948 | 4/1992 | Deguchi et al. | 524/789 |
| 5,164,440 | 11/1992 | Deguchi et al. | 524/444 |
| 5,164,460 | 11/1992 | Yano et al. | 624/445 |
| 5,204,078 | 4/1993 | Tateyama et al. | 423/331 |
| 5,206,284 | 4/1993 | Fukui et al. | 524/504 |
| 5,229,451 | 7/1993 | Carter et al. | 524/493 |
| 5,248,720 | 9/1993 | Deguchi et al. | 524/444 |
| 5,326,500 | 7/1994 | Friedman et al. | 252/378 |
| 5,340,558 | 8/1994 | Friedman et al. | 423/328.1 |
| 5,385,776 | 1/1995 | Maxfield et al. | 428/297 |
| 5,391,437 | 2/1995 | Miyasaka et al. | 528/425.5 |
| 5,414,042 | 5/1995 | Yasue et al. | 524/789 |
| 5,428,094 | 6/1995 | Tokoh et al. | 524/379 |
| 5,506,046 | 4/1996 | Andersen et al. | 524/446 |
| 5,508,072 | 4/1996 | Andersen et al. | 524/446 |
| 5,514,734 | 5/1996 | Maxfield et al. | 523/204 |
| 5,552,469 | 9/1996 | Beall et al. | 524/445 |
| 5,578,672 | 11/1996 | Beall et al. | 624/446 |
| 5,667,886 | 9/1997 | Gough et al. | 428/331 |
| 5,698,624 | 12/1997 | Beall et al. | 524/445 |
| 5,730,996 | 3/1998 | Beall et al. | 424/405 |
| 5,760,106 | 6/1998 | Pinnavaia et al. | 523/209 |
| 5,760,121 | 6/1998 | Beall et al. | 524/450 |
| 5,804,613 | 9/1998 | Beall et al. | 523/200 |

OTHER PUBLICATIONS

R.A. Vaia, et al., "Synthesis and Properties of Two–Dimensional Nanostructures by Direct Intercalation of Polymer Melts in Layered Silicates", Chem. Mater. 1993, 5, pp. 1694–1696.

R.A. Vaia, et al., "New Polymer Electrolyte Nanocomposites: Melt Intercalation of Poly(ethylene oxide) in Mica–Type Silicates", Advanced Materials 1995, 7, No. 2, pp. 154–156.

A. Akelah, et al., "Synthesis and Characterization of Epoxyphilic montmorillonites", Clay Minerals (1994) 29, pp. 169–178

C.E. Clapp, et al., "Adsorption Studies Of A Dextran On Montmorillonite", Trans. 9th Int. Cong. Soil Sci., 1968, vol. 1, pp. 627–634.

H.G.G. Dekking, "Preparation And Properties Of Some Polymer–Clay Compounds", Clays and Clay Minerals, 1964, 12, pp. 603–616.

A. Usuki, et al., "Characterization and Properties of Nylon 6—Clay Hybrid", (source and date unknown), pp. 651–652.

G.W. Brindley, et al., "Preparation And Solvatio Properties Of Some Variable Charge Montmorillonites", Clays and Clay Minerals, 1971, vol. 18, pp. 399–404.

A. Okada, et al., "A Solid State NMR Study On Crystalline Forms Of Nylon 6", Journal of Applied Polymer Science, (1989), vol. 37, pp. 1363–1371.

A. Usuki, et al., Swelling Behavior Of Montmorillonite Cation Exchanged For $\omega$–Amino Acids By $\epsilon$–Caprolactam, J. Mater. Res., vol. 8, No. 5, May 1993, pp. 1174–1178.

Y. Kojima, et al., "One–Pot Synthesis Of Nylon 6–Clay Hybrid", Journal of Polymer Science: Part A: Polymer Chemistry, vol. 31, (1993), pp. 1755–1758.

Y. Kojima, et al., "Fine Structure Of Nylon–6–Clay Hybrid", Journal of Polymer Science: Part B: Polymer Physics, vol. 32 (1994), pp. 625–630.

B.K.G. Theng, "Clay–Polymer interactions: Sumary And Perspectives", Clays and Clay Minerals, vol. 30, No. 1 (1982) pp. 1–9.

Sugahara, et al., "Clay–Organic Nano–Composite; Preparation of a Kaolinite–Poly(vinylpyrrolidone) Intercalation Compound", *Journal of the Ceramic Society of Japan*, International Edition, vol. 100, No. 4, Apr. 1, 1992, pp. 420–423.

Ogawa, et al., "Preparation Of Montmorillonite–Polyacrylamide Intercalation Compounds And The Water Absorbing Property", Clay Science, vol. 7, 1989 Tokyo, Japan, pp. 243–251.

Wu, et al., "Structural, thermal, and electrical characterization of layered nanocomposites derived from sodium–montmorillonite and polyethers", Chemical Abstracts, vol. 119, No. 4, Jul. 26, 1993 Columbus, Ohio, US, Abstract No. 31017r.

Bujdak, et al., "The reaction of montmorillonite with octadecylamine in solid and melted state", Chemical Abstracts, vol. 118, No. 26, Abstract No. 257609b, p. 166 (Jun. 28, 1993), Columbus, Ohio (US).

Yano, et al., "Synthesis And Properties Of Polymide–Clay Hybrid", Polymer Preprints, ACS, Apr. 1991, pp. 65–66.

Giannelis, et al., "Synthesis And Processing Of Ceramics: Scientific Issues", Materials Research Society Symposium Proceedings, vol. 249 (1992), pp. 547–558.

Sanchez Camazano, M. et al., "Factors influencing interactions of organophosphorus pesticides with montmorillonite", Chemical Abstracts, vol. 98, No. 19, May 9, 1983, Columbus, Ohio, US, Abstract No. 156367.

T. Lan, et al., "Clay–Epoxy Nanocomposites:Relationships Between Reinforcement Properties And The Extent Of Clay Layer Exfoliation", Polym. Mater. Sc. Eng., 73, pp. 296–297 (1995).

FIG. 1  ⊖Na ⊖Mg ○Al ○✕○ ⊘Si
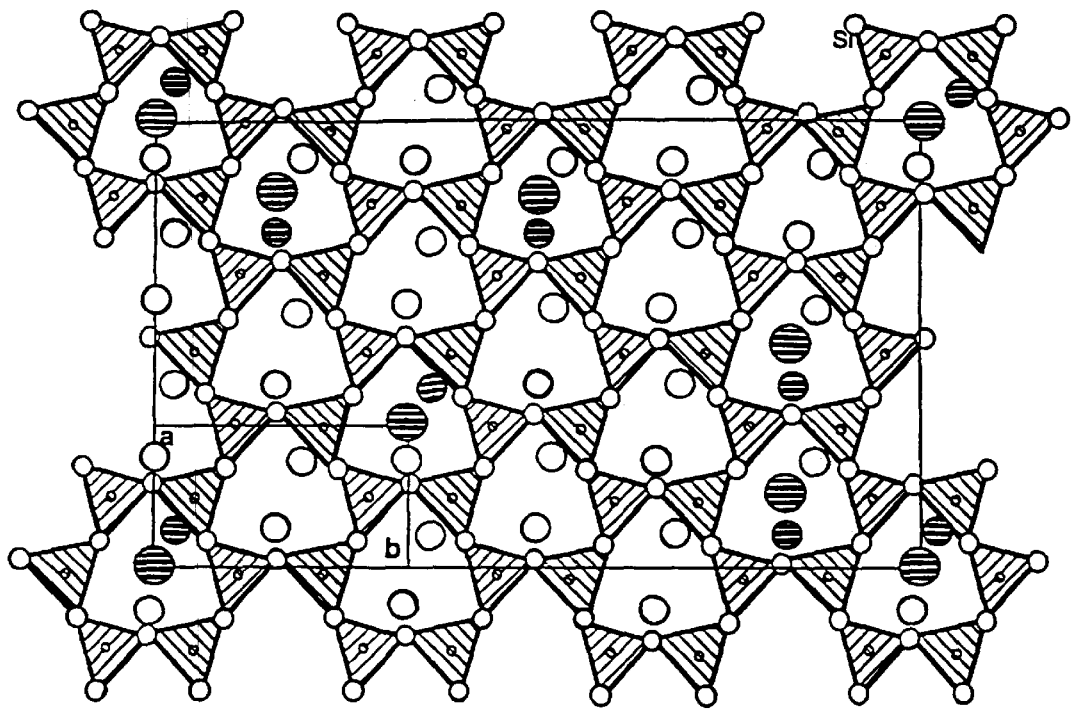
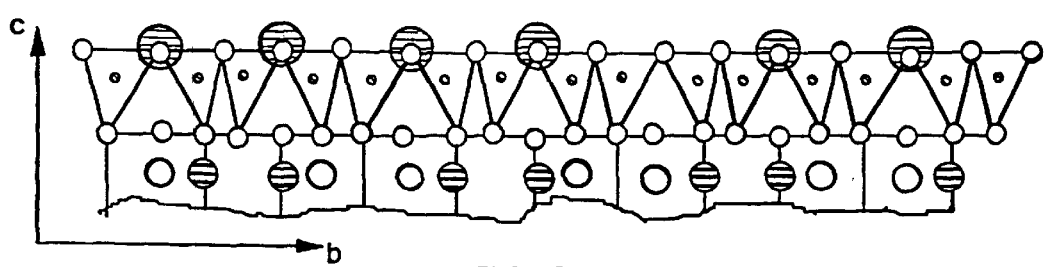
FIG. 2
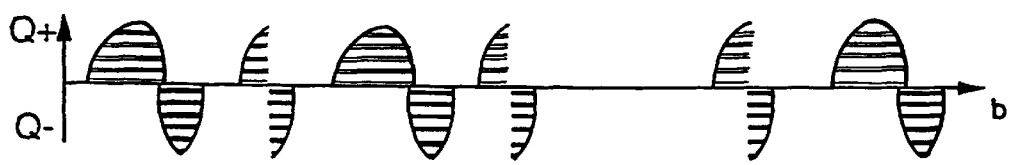
FIG. 3

INTERCALATES AND EXFOLIATES FORMED WITH HYDROXYL-FUNCTIONAL; POLYHYDROXYL-FUNCTIONAL; AND AROMATIC COMPOUNDS; COMPOSITE MATERIALS CONTAINING SAME AND METHODS OF MODIFYING RHEOLOGY THEREWITH

This application is a continuation of U.S. application Ser. No. 08/654,648 filed May 29, 1996 now U.S. Pat. No. 5,830,528.

FIELD OF THE INVENTION

The present invention is directed to intercalated layered materials, and exfoliates thereof, manufactured by sorption (adsorption and/or absorption) of one or more functional monomeric organic compounds between planar layers of a swellable layered material, such as a phyllosilicate or other layered material, to expand the interlayer spacing of adjacent layers to at least about 5 Angstroms (Å), preferably at least about 10 Å. More particularly, the present invention is directed to intercalates having at least two layers of monomeric organic compounds sorbed on the internal surfaces of adjacent layers of the planar platelets of a layered material, such as a phyllosilicate, preferably a smectite clay, to expand the interlayer spacing to at least about 5 Å, preferably at least about 10 Å, more preferably to at least about 20 Å, and most preferably to at least about 30–45 Å, up to about 100 Å, or disappearance of periodicity. The intercalated layered materials preferably have at least two layers of monomeric hydroxyl-functional, polyhydroxyl-functional, or aromatic-functional molecules sorbed on the internal surfaces between adjacent layers of the planar platelets of the layered material, such as a phyllosilicate, preferably a smectite clay. The resulting intercalates are neither entirely organophilic nor entirely hydrophilic, but a combination of the two, and easily can be exfoliated and combined as individual platelets with a polar organic solvent carrier to form a viscous composition having a myriad of uses. The resulting polar organic solvent carrier/intercalate or carrier/platelet composite materials are useful as plasticizers; for providing increased viscosity and elasticity to thermoplastic and thermosetting polymers, e.g., for plasticizing polyvinyl chloride; for food wrap having improved gas impermeability; electrical components; food grade drink containers; particularly for raising the viscosity of polar organic liquids; and for altering one or more physical properties of a matrix polymer, such as elasticity and temperature characteristics, e.g., glass transition temperature and high temperature resistance.

BACKGROUND OF THE INVENTION AND PRIOR ART

It is well known that phyllosilicates, such as smectite clays, e.g., sodium montmorillonite and calcium montmorillonite, can be treated with organic molecules, such as organic ammonium ions, to intercalate the organic molecules between adjacent, planar silicate layers, for bonding the organic molecules with a polymer, for intercalation of the polymer between the layers, thereby substantially increasing the interlayer (interlaminar) spacing between the adjacent silicate layers. The thus-treated, intercalated phyllosilicates, having interlayer spacings of at least about 10–20 Å and up to about 100 Angstroms, then can be exfoliated, e.g., the silicate layers are separated, e.g., mechanically, by high shear mixing. The individual silicate layers, when admixed with a matrix polymer, before, after or during the polymerization of the matrix polymer, e.g., a polyamide—see U.S. Pat. Nos. 4,739,007; 4,810,734; and 5,385,776—have been found to substantially improve one or more properties of the polymer, such as mechanical strength and/or high temperature characteristics.

Exemplary prior art composites, also called "nanocomposites", are disclosed in published PCT disclosure of Allied Signal, Inc. WO 93/04118 and U.S. Pat. No. 5,385,776, disclosing the admixture of individual platelet particles derived from intercalated layered silicate materials, with a polymer to form a polymer matrix having one or more properties of the matrix polymer improved by the addition of the exfoliated intercalate. As disclosed in WO 93/04118, the intercalate is formed (the interlayer spacing between adjacent silicate platelets is increased) by adsorption of a silane coupling agent or an onium cation, such as a quaternary ammonium compound, having a reactive group which is compatible with the matrix polymer. Such quaternary ammonium cations are well known to convert a highly hydrophilic clay, such as sodium or calcium montmorillonite, into an organophilic clay capable of sorbing organic molecules. A publication that discloses direct intercalation (without solvent) of polystyrene and poly (ethylene oxide) in organically modified silicates is *Synthesis and Properties of Two-Dimensional Nanostructures by Direct Intercalation of Polymer Melts in Layered Silicates*, Richard A. Vaia, et al., *Chem. Mater.*, 5:1694–1696(1993). Also as disclosed in *Adv. Materials*, 7, No. 2: (1985), pp, 154–156, *New Polymer Electrolyte Nanocomposites: Melt Intercalation of Poly(Ethylene Oxide) in Mica-Type Silicates*, Richard A. Vaia, et al., poly(ethylene oxide) can be intercalated directly into Na-montmorillonite and Li-montmorillonite by heating to 80° C. for 2–6 hours to achieve a d-spacing of 17.7 Å. The intercalation is accompanied by displacing water molecules, disposed between the clay platelets, with polymer molecules. Apparently, however, the intercalated material could not be exfoliated and was tested in pellet form. It was quite surprising to one of the authors of these articles that exfoliated material could be manufactured in accordance with the present invention.

Previous attempts have been made to intercalate polyvinylpyrrolidone (PVP), polyvinyl alcohol (PVA) and poly (ethylene oxide) (PEO) between montmorillonite clay platelets with little success. As described in Levy, et al., *Interlayer Adsorption of Polyvinylpyrrolidone on Montmorillonite*, Journal of Colloid and Interface Science, Vol. 50, No. 3, March 1975, pages 442–450, attempts were made to sorb PVP (40,000 average M.W.) between monoionic montmorillonite clay platelets (Na, K, Ca and Mg) by successive washes with absolute ethanol, and then attempting to sorb the PVP by contact with 1% PVP/ethanol/water solutions, with varying amounts of water, via replacing the ethanol solvent molecules that were sorbed in washing (to expand the platelets to about 17.7 Å). Only the sodium montmorillonite had expanded beyond a 20 Å basal spacing (e.g., 26 Å and 32 Å), at $5^+$% $H_2O$, after contact with the PVP/ethanol/$H_2O$ solution. It was concluded that the ethanol was needed to initially increase the basal spacing for later sorption of PVP, and that water did not directly affect the sorption of PVP between the clay platelets (Table II, page 445), except for sodium montmorillonite. The sorption was time consuming and difficult and met with little success.

Further, as described in Greenland, *Adsorption of Polyvinyl Alcohols by Montmorillonite*, Journal of Colloid Sciences, Vol. 18, pages 647–664 (1963), polyvinyl alcohols containing 12% residual acetyl groups could increase the basal spacing by only about 10 Å due to the sorbed polyvinyl alcohol (PVA). As the concentration of polymer in the intercalant polymer-containing solution was increased from 0.25% to 4%, the amount of polymer sorbed was substantially reduced, indicating that sorption might only be effective at polymer concentrations in the intercalant polymer-containing composition on the order of 1% by weight polymer, or less. Such a dilute process for intercalation of polymer into layered materials would be exceptionally costly in drying the intercalated layered materials for separation of intercalate from the polymer carrier, e.g., water, and, therefore, apparently no further work was accomplished toward commercialization.

In accordance with one embodiment of the present invention, intercalates are prepared by contacting a phyllosilicate with a monomeric organic compound having an electrostatic functionality selected from the group consisting of a hydroxyl; a polyhydroxyl; an aromatic functionality; and mixtures thereof.

In accordance with an important feature of the present invention, best results are achieved using the monomeric organic compound, having at least one of the above-defined functionalities, in a concentration of at least about 2%, preferably at least about 5% by weight functional monomeric organic compound, more preferably at least about 10% by weight monomeric organic compound, and most preferably about 30% to about 80% by weight, based on the weight of functional monomeric organic compound and carrier (e.g., water, with or without an organic solvent for the functional monomeric compound) to achieve better sorption of the functional monomeric organic compound between phyllosilicate platelets. Regardless of the concentration of functional monomeric organic compound in aqueous liquid, the intercalating composition should have a functional monomeric organic compound:layered material ratio of at least 1:20, preferably at least 1:10, more preferably at least 1:5, and most preferably about 1:4 to achieve efficient intercalation of the functional monomeric organic compound between adjacent platelets of the layered material. The functional monomeric organic compound sorbed between and bonded to the silicate platelets causes separation or added spacing between adjacent silicate platelets.

For simplicity of description, the above-described functional monomeric organic compounds are hereinafter called the "intercalant" or "intercalant monomer" or "monomer intercalant". The monomer intercalant will be sorbed sufficiently to increase the interlayer spacing of the phyllosilicate in the range of about 5 Å to about 100 Å, preferably at least about 10 Å for easier and more complete exfoliation, in a commercially viable process, regardless of the particular phyllosilicate or intercalant monomer.

In accordance with the present invention, it has been found that a phyllosilicate, such as a smectite clay, can be intercalated sufficiently for subsequent exfoliation by sorption of organic monomer compounds that have a hydroxyl or polyhydroxyl functionality; or at least one aromatic ring to provide bonding between two functional hydroxyl groups of one or two intercalant monomer molecules and the metal cations of the inner surfaces of the phyllosilicate platelets. Sorption and metal cation attraction or bonding of a platelet metal cation between two hydroxyl groups of the intercalant monomer molecules; or the bonding between the interlayer cations in hexagonal or pseudohexagonal rings of the smectite platelet layers and an intercalant monomer aromatic ring structure, is provided by a mechanism selected from the group consisting of ionic complexing; electrostatic complexing; chelation; hydrogen bonding; dipole/dipole; Van Der Waals forces; and any combination thereof.

Such bonding, via a metal cation of the phyllosilicate sharing electrons with two electronegative atoms of one or two intercalant monomer molecules, to an inner surface of the phyllosilicate platelets provides adherence between the functional monomeric organic molecules and the platelet inner surfaces of the layered material, and increases the interlayer spacing between adjacent silicate platelets or other layered material to at least about 5 Å, preferably to at least about 10 Å, more preferably to at least about 20 Å, and most preferably in the range of about 30 Å to about 45 Å. The electronegative atoms can be, for example, oxygen, sulfur, nitrogen, and combinations thereof.

Such intercalated phyllosilicates easily can be exfoliated into individual phyllosilicate platelets before or during admixture with a liquid carrier or solvent, for example, one or more monohydric alcohols, such as methanol, ethanol, propanol, and/or butanol; polyhydric alcohols, such as glycerols and glycols, e.g., ethylene glycol, propylene glycol, butylene glycol, glycerine and mixtures thereof; aldehydes; ketones; carboxylic acids; amines; amides; and other organic solvents, for delivery of the solvent in a thixotropic composition, or for delivery of any active hydrophobic or hydrophilic organic compound, such as a topically active pharmaceutical, dissolved or dispersed in the carrier or solvent, in a thixotropic composition; or the intercalates and/or exfoliates thereof can be admixed with a polymer or other organic monomer compound(s) or composition to increase the viscosity of the organic compound or provide a polymer/intercalate and/or exfoliate composition to enhance one or more properties of a matrix polymer.

DEFINITIONS

Whenever used in this Specification, the terms set forth shall have the following meanings:

"Layered Material" shall mean an inorganic material, such as a smectite clay mineral, that is in the form of a plurality of adjacent, bound layers and has a thickness, for each layer, of about 3 Å to about 50 Å, preferably about 10 Å.

"Platelets" shall mean individual layers of the Layered Material.

"Intercalate" or "Intercalated" shall mean a Layered Material that includes hydroxyl-functional organic monomer molecules and/or aromatic-functional organic monomer molecules disposed between adjacent platelets of the Layered Material to increase the interlayer spacing between the adjacent platelets to at least about 5 Å, preferably at least about 10 Å.

"Intercalation" shall mean a process for forming an Intercalate.

"Intercalant Monomer" or "Intercalant" shall mean a monomeric organic compound that includes a functionality selected from the group consisting of a hydroxyl; a polyhydroxyl; an aromatic ring; and mixtures thereof that is sorbed between Platelets of the Layered Material and complexes with the platelet surfaces to form an Intercalate.

"Intercalating Carrier" shall mean a carrier comprising water with or without an organic solvent used together with an Intercalant Monomer to form an Intercalating Composition capable of achieving Intercalation of the Layered Material.

"Intercalating Composition" shall mean a composition comprising an Intercalant Monomer, an Intercalating Carrier for the Intercalant Monomer, and a Layered Material.

"Exfoliate" or "Exfoliated" shall mean individual platelets of an Intercalated Layered Material so that adjacent platelets of the Intercalated Layered Material can be dispersed individually throughout a carrier material, such as water, a polymer, an alcohol or glycol, or any other organic solvent.

"Exfoliation" shall mean a process for forming an Exfoliate from an Intercalate.

SUMMARY OF THE INVENTION

In brief, the present invention is directed to intercalates and exfoliates thereof formed by contacting a layered phyllosilicate with a functional organic monomer (intercalant monomer), having at least one hydroxyl functionality and/or an aromatic ring, to sorb or intercalate the intercalant monomer or mixtures of intercalant monomers between adjacent phyllosilicate platelets. Sufficient intercalant monomer is sorbed between adjacent phyllosilicate platelets to expand the spacing between adjacent platelets (interlayer spacing) to a distance of at least about 5 Å, preferably to at least about 10 Å (as measured after water removal to a maximum water content of 5% by weight, based on the dry weight of the layered material) and more preferably in the range of about 30–45 Å, so that the intercalate easily can be exfoliated, sometimes naturally without shearing being necessary. At times, the intercalate requires shearing that easily can be accomplished, e.g., when mixing the intercalate with a polar organic solvent carrier, such as a polar organic hydrocarbon, and/or with a polymer melt to provide a platelet-containing composite material or nanocomposite— the platelets being obtained by exfoliation of the intercalated phyllosilicate.

The intercalant monomer has an affinity for the phyllosilicate so that it is sorbed between, and is maintained associated with the silicate platelets in the interlayer spaces, and after exfoliation. In accordance with the present invention, the intercalant monomer should include an aromatic ring and/or have a hydroxyl or polyhydroxyl functionality to be sufficiently bound, it is hereby theorized, by a mechanism selected from the group consisting of ionic complexing; electrostatic complexing; chelation; hydrogen bonding; dipole/dipole; Van Der Waals forces; and any combination thereof. Such bonding, via a metal cation of the phyllosilicate sharing electrons with electronegative atoms of one or two hydroxyl or aromatic ring structures, to an inner surface of the phyllosilicate platelets provides adherence between the intercalant monomer molecules and the platelet inner surfaces of the layered material. The electronegative atoms can be, for example, oxygen, sulfur, nitrogen, and combinations thereof. Atoms having a sufficient electronegativity to bond to metal cations on the inner surface of the platelets have an electronegativity of at least 2.0, and preferably at least 2.5, on the Pauling Scale. A "polar moiety" or "polar group" is defined as a moiety having two adjacent atoms that are bonded covalently and have a difference in electronegativity of at least 0.5 electronegativity units on the Pauling Scale.

Such intercalant monomers have sufficient affinity for the phyllosilicate platelets to maintain sufficient interlayer spacing for exfoliation, without the need for coupling agents or spacing agents, such as the onium ion or silane coupling agents disclosed in the above-mentioned prior art. A schematic representation of the charge distribution on the surfaces of a sodium montmorillonite clay is shown in FIGS. 1–3. As shown in FIGS. 2 and 3, the location of surface $Na^+$ cations with respect to the location of oxygen (Ox), Mg, Si and Al atoms (FIGS. 1 and 2) results in a clay surface charge distribution as schematically shown in FIG. 3. The positive-negative charge distribution over the entire clay surface provides for excellent dipole/dipole attraction of polar hydroxyl-functional and/or aromatic-functional monomers on the surfaces of the clay platelets.

The intercalate-containing and/or exfoliate-containing compositions can be in the form of a stable thixotropic gel that is not subject to phase separation and can be used to deliver any active materials, such as in the cosmetic, hair care and pharmaceutical industries. The layered material is intercalated and optionally exfoliated by contact with an intercalant monomer and water and then mixed and/or extruded to intercalate the monomer between adjacent phyllosilicate platelets and optionally separate (exfoliate) the layered material into individual platelets. The amount of water varies, depending upon the amount of shear imparted to the layered material in contact with the intercalant monomer and water. In one method, the intercalating composition is pug milled or extruded at a water content of about 25% by weight to about 50% by weight water, preferably about 35% to about 40% by weight water, based on the dry weight of the layered material, e.g., clay. In another method, the clay and water are slurried, with at least about 25% by weight water, preferably at least about 65% by weight water, based on the dry weight of the layered material, e.g., preferably less than about 20% by weight clay in water, based on the total weight of layered material and water, more preferably less than about 10% layered material in water, with the addition of about 2% by weight to about 90% by weight intercalant monomer, based on the dry weight of the layered material.

Sorption of the intercalant monomer should be sufficient to achieve expansion of adjacent platelets of the layered material (when measured dry) to an interlayer spacing of at least about 5 Å, preferably to a spacing of at least about 10 Å, more preferably a spacing of at least about 20 Å, and most preferably a spacing of about 30–45 Å. To achieve intercalates that can be exfoliated easily using the monomer intercalants disclosed herein, the weight ratio of intercalant monomer to layered material, preferably a water-swellable smectite clay such as sodium bentonite, in the intercalating composition should be at least about 1:20, preferably at least about 1:12 to 1:10, more preferably at least about 1:5, and most preferably about 1:5 to about 1:3. It is preferred that the concentration of intercalant monomer in the intercalating composition, based on the total weight of intercalant monomer plus intercalant carrier (water plus any non-hydroxyl-containing and non-aromatic ring-containing organic liquid solvent) in the intercalating composition is at least about 15% by weight, more preferably at least about 20% by weight intercalant monomer, for example about 20–30% to about 90% by weight intercalant monomer, based on the weight of intercalant monomer plus intercalating carrier in the intercalant composition during intercalation.

Interlayer spacings sufficient for exfoliation have never been achieved by direct intercalation of the above-defined intercalant monomers, without prior sorption of an onium or silane coupling agent, and provides easier and more complete exfoliation for or during incorporation of the platelets into a polar organic compound or a polar organic compound-containing composition carrier or solvent to provide unexpectedly viscous carrier compositions, for delivery of the carrier or solvent, or for administration of an active compound that is dissolved or dispersed in the carrier or solvent. Such compositions, especially the high viscosity gels, are particularly useful for delivery of active compounds, such as oxidizing agents for hair waving lotions, and drugs for topical administration, since extremely high viscosities are obtainable; and for admixtures of the platelets with polar solvents in modifying rheology, e.g., of cosmetics, oil-well drilling fluids, paints, lubricants, especially food grade lubricants, in the manufacture of oil and grease, and the like. Such intercalates also are especially useful in admixture with matrix thermoplastic or thermosetting polymers in the manufacture of polymeric articles from the polar organic carrier/polymer/intercalate and/or platelet composite materials.

Once exfoliated, the platelets of the intercalate are predominantly completely separated into individual platelets and the originally adjacent platelets no longer are retained in a parallel, spaced disposition, but are free to move as predominantly individual intercalant monomer-coated (continuously or discontinuously) platelets throughout a carrier or solvent material to maintain viscosity and thixotropy of the carrier material. The predominantly individual phyllosilicate platelets, having their platelet surfaces complexed with intercalant monomer molecules, are randomly, homogeneously and uniformly dispersed, predominantly as individual platelets, throughout the carrier or solvent to achieve new and unexpected viscosities in the carrier/ platelet compositions even after addition of an active organic compound, such as a cosmetic component or a medicament, for administration of the active organic compound(s) from the composition.

As recognized, the thickness of the exfoliated, individual platelets (about 10 Å) is relatively small compared to the size of the flat opposite platelet faces. The platelets have an aspect ratio in the range of about 200 to about 2,000. Dispersing such finely divided platelet particles into a polymer melt or into a polar organic liquid carrier imparts a very large area of contact between carrier and platelet particles, for a given volume of particles in the composite, and a high degree of platelet homogeneity in the composite material. Platelet particles of high strength and modulus, dispersed at sub-micron size (nanoscale), impart greater mechanical reinforcement and a higher viscosity to a polar organic liquid carrier than do comparable loadings of conventional reinforcing fillers of micron size, and can impart lower permeability to matrix polymers than do comparable loadings of conventional fillers.

BRIEF DESCRIPTION OF THE DRAWINGS

FIG. 1 is a schematic representation of a top view of sodium montmorillonite clay showing the ionic charge distribution for the sodium montmorillonite clay top and interlayer surfaces showing $Na^+$ ions as the largest circles as well as magnesium and aluminum ions and Si and oxygen (Ox) atoms disposed beneath the sodium ions;

FIG. 2 is a side view (bc-projection) of the schematic representation of FIG. 1;

FIG. 3 is a schematic representation of the charge distribution on the surfaces of sodium montmorillonite clay platelets showing the distribution of positive and negative charges on the clay platelet surfaces as a result of the natural disposition of the Na, Mg, Al, Si, and oxygen (Ox) atoms of the clay shown in FIGS. 1 and 2;

DETAILED DESCRIPTION OF THE PREFERRED EMBODIMENTS

Figure 4:
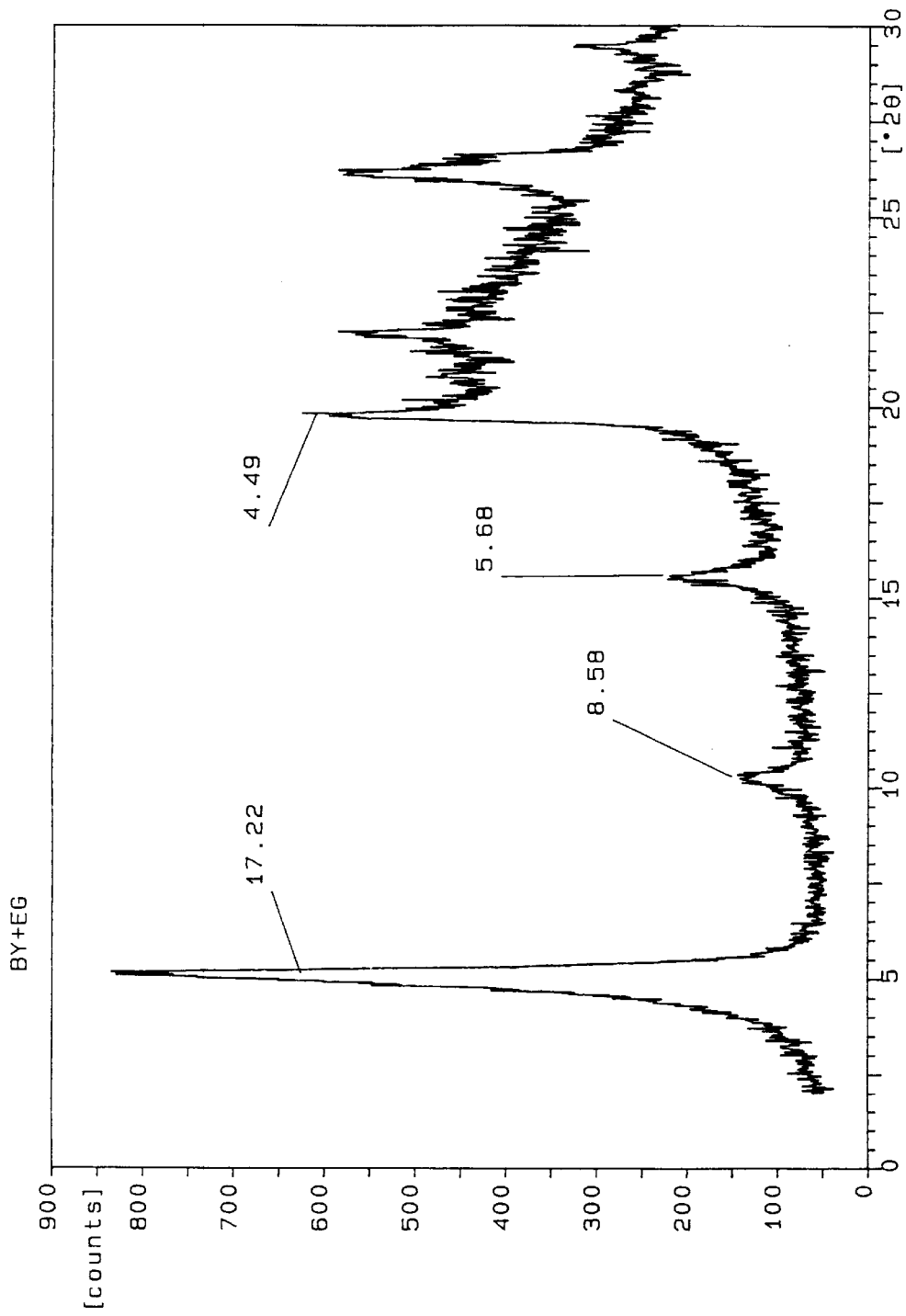
FIG. 4 is an x-ray diffraction pattern for a mixture of ethylene glycol and sodium montmorillonite.

To form the intercalated and exfoliated materials of the present invention, the layered material, e.g., the phyllosilicate, should be swelled or intercalated by sorption of an intercalant monomer that includes an aromatic ring and/or a hydroxyl or polyhydroxyl functionality. In accordance with a preferred embodiment of the present invention, the phyllosilicate should include at least 4% by weight water, up to about 5,000% by weight water, based on the dry weight of the phyllosilicate, preferably about 7% to about 100% water, more preferably about 25% to about 50% by weight water, prior to or during contact with the intercalant monomer to achieve sufficient intercalation for exfoliation. Preferably, the phyllosilicate should include at least about 4% by weight water before contact with the intercalating carrier for efficient intercalation. The amount of intercalant monomer in contact with the phyllosilicate from the intercalating composition, for efficient exfoliation, should provide an intercalant monomer/phyllosilicate weight ratio (based on the dry weight of the phyllosilicate) of at least about 1:20, preferably at least about 3.2/20, and more preferably about 4–14/20, to provide efficient sorption and complexing (intercalation) of the intercalant monomer between the platelets of the layered material, e.g., phyllosilicate.

The monomer intercalants are introduced in the form of a solid or liquid composition (neat or aqueous, with or without a non-hydroxyl-containing and/or a non-aromatic ring-containing organic solvent, e.g., an aliphatic hydrocarbon, such as heptane) having an intercalant monomer concentration of at least about 2%, preferably at least about 5% by weight intercalant monomer, more preferably at least about 50% to about 100% by weight intercalant monomer in the intercalating composition, based on the dry weight of the layered material, for intercalant monomer sorption. The intercalant monomer can be added as a solid with the addition to the layered material/intercalant monomer blend of about 20% water, preferably at least about 30% water to about 5,000% water or more, based on the dry weight of layered material. Preferably about 30% to about 50% water, more preferably about 30% to about 40% water, based on the dry weight of the layered material, is included in the intercalating composition when extruding or pug milling, so that less water is sorbed by the intercalate, thereby necessitating less drying energy after intercalation. The monomer intercalants may be introduced into the spaces between every layer, nearly every layer, or at least a predominance of the layers of the layered material such that the subsequently exfoliated platelet particles are preferably, predominantly less than about 5 layers in thickness; more preferably, predominantly about 1 or 2 layers in thickness; and most preferably, predominantly single platelets.

Any swellable layered material that sufficiently sorbs the intercalant monomer to increase the interlayer spacing between adjacent phyllosilicate platelets to at least about 5 Å, preferably to at least about 10 Å (when the phyllosilicate is measured dry) may be used in the practice of this invention. Useful swellable layered materials include phyllosilicates, such as smectite clay minerals, e.g., montmorillonite, particularly sodium montmorillonite; magnesium montmorillonite and/or calcium montmorillonite; nontronite; beidellite; volkonskoite; hectorite; saponite; sauconite; sobockite; stevensite; svinfordite; vermiculite; and the like. Other useful layered materials include micaceous minerals, such as illite and mixed layered illite/smectite minerals, such as rectorite, tarosovite, ledikite and admixtures of illites with the clay minerals named above.

Other layered materials having little or no charge on the layers may be useful in this invention provided they can be intercalated with the intercalant monomers to expand their interlayer spacing to at least about 5 Å, preferably to at least about 10 Å. Preferred swellable layered materials are phyllosilicates of the 2:1 type having a negative charge on the layers ranging from about 0.15 to about 0.9 charges per formula unit and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

As used herein the "interlayer spacing" refers to the distance between the internal faces of the adjacent layers as they are assembled in the layered material before any delamination (exfoliation) takes place. The interlayer spacing is measured when the layered material is "air dry", e.g., contains about 3–6% by weight water, e.g., 5% by weight water based on the dry weight of the layered material. The preferred clay materials generally include interlayer cations such as $Na^+$, $Ca^{+2}$, $K^+$, $Mg^{+2}$, $NH_4^+$ and the like, including mixtures thereof.

The amount of intercalant monomer intercalated into the swellable layered materials useful in this invention, in order that the intercalated layered material platelets surfaces sufficiently complex with the intercalant monomer molecules such that the layered material may be easily exfoliated or delaminated into individual platelets, may vary substantially between about 10% and about 90%, based on the dry weight of the layered silicate material. In the preferred embodiments of the invention, amounts of monomer intercalants employed, with respect to the dry weight of layered material being intercalated, will preferably range from about 8 grams of intercalant monomer:100 grams of layered material (dry basis), preferably at least about 10 grams of intercalant monomer:100 grams of layered material to about 80–90 grams intercalant monomer:100 grams of layered material. More preferred amounts are from about 20 grams intercalant monomer:100 grams of layered material to about 60 grams intercalant monomer:100 grams of layered material (dry basis).

The monomer intercalants are introduced into (sorbed within) the interlayer spaces of the layered material in one of two ways. In a preferred method of intercalating, the layered material is intimately mixed, e.g., by extrusion or pug milling, to form an intercalating composition comprising the layered material, in an intercalant monomer/water solution, or intercalant monomer, water and an organic carrier for the hydroxyl-functional or aromatic-functional intercalant monomer. To achieve sufficient intercalation for exfoliation, the layered material/intercalant monomer blend contains at least about 8% by weight, preferably at least about 10% by weight intercalant monomer, based on the dry weight of the layered material. The intercalant monomer carrier (preferably water, with or without an organic solvent) can be added by first solubilizing or dispersing the intercalant monomer in the carrier; or a dry intercalant monomer and relatively dry phyllosilicate (preferably containing at least about 4% by weight water) can be blended and the intercalating carrier added to the blend, or to the phyllosilicate prior to adding the dry intercalant monomer. In every case, it has been found that surprising sorption and complexing of intercalant monomer between platelets is achieved at relatively low loadings of intercalating carrier, especially $H_2O$, e.g., at least about 4% by weight water, based on the dry weight of the phyllosilicate. When intercalating the phyllosilicate in slurry form (e.g., 900 pounds water, 100 pounds phyllosilicate, 25 pounds intercalant monomer) the amount of water can vary from a preferred minimum of at least about 30% by weight water, with no upper limit to the amount of water in the intercalating composition (the phyllosilicate intercalate is easily separated from the intercalating composition).

Alternatively, the intercalating carrier, e.g., water, with or without an organic solvent, can be added directly to the phyllosilicate prior to adding the intercalant monomer, either dry or in solution. Sorption of the monomer intercalant molecules may be performed by exposing the layered material to dry or liquid intercalant monomers in the intercalating composition containing at least about 2% by weight, preferably at least about 5% by weight intercalant monomer, more preferably at least about 50% intercalant monomer, based on the dry weight of the layered material. Sorption may be aided by exposure of the intercalating composition to heat, pressure, ultrasonic cavitation, or microwaves.

In accordance with another method of intercalating the intercalant monomer between the platelets of the layered material and exfoliating the intercalate, the layered material, containing at least about 4% by weight water, preferably about 10% to about 15% by weight water, is blended with an aqueous solution of an intercalant monomer in a ratio sufficient to provide at least about 8% by weight, preferably at least about 10% by weight intercalant monomer, based on the dry weight of the layered material. The blend then preferably is extruded for faster intercalation of the intercalant monomer with the layered material.

The intercalant monomer has an affinity for the phyllosilicate so that it is sorbed between, and is maintained associated with the surfaces of the silicate platelets, in the interlayer spaces, and after exfoliation. In accordance with the present invention, the intercalant monomer should include a hydroxyl and/or an aromatic ring functionality to be sufficiently bound to the platelet surfaces, it is hereby theorized, by a mechanism selected from the group consisting of ionic complexing; electrostatic complexing; chelation; hydrogen bonding; dipole/dipole; Van Der Waals forces; and any combination thereof. Such bonding, via a metal cation of the phyllosilicate sharing electrons with electronegative atoms of one or two hydroxyl molecules or aromatic ring molecules from a hydroxyl functionality or aromatic ring functionality of one or two intercalant monomer molecules, to an inner surface of the phyllosilicate platelets provides adherence between the hydroxyl and/or aromatic ring molecules and the platelet inner surfaces of the layered material. Such intercalant monomers have sufficient affinity for the phyllosilicate platelets to maintain sufficient interlayer spacing for exfoliation, without the need for coupling agents or spacing agents, such as the onium ion or silane coupling agents disclosed in the above-mentioned prior art.

As shown in FIGS. 1–3, the disposition of surface $Na^+$ ions with respect to the disposition of oxygen (Ox), Mg, Si, and Al atoms, and the natural clay substitution of $Mg^{+2}$ cations for $Al^{+3}$ cations, leaving a net negative charge at the sites of substitution, results in a clay surface charge distribution as shown in FIG. 3. This alternating positive to negative surface charge over spans of the clay platelets surfaces, and on the clay platelet surfaces in the interlayer spacing, provide for excellent dipole/dipole attraction of polar hydroxyl and/or aromatic-functional monomeric molecules for intercalation of the clay and for bonding of such polar molecules on the platelet surfaces, after exfoliation.

It is preferred that the platelet loading be less than about 10%. Platelet particle loadings within the range of about 0.05% to about 40% by weight, preferably about 0.5% to about 20%, more preferably about 1% to about 10% of the composite material significantly enhances viscosity. In general, the amount of platelet particles incorporated into a liquid carrier, such as a polar solvent, e.g., a glycol such as glycerol, is less than about 90% by weight of the mixture, and preferably from about 0.01% to about 80% by weight of the composite material mixture, more preferably from about 0.05% to about 40% by weight of the mixture, and most preferably from about 0.05% to about 20% or 0.05% to about 10% by weight.

In accordance with an important feature of the present invention, the intercalated phyllosilicate can be manufactured in a concentrated form, e.g., 10–90%, preferably 20–80% intercalant monomer with or without another polar organic compound carrier and 10–90%, preferably 20–80% intercalated phyllosilicate that can be dispersed in the polar organic carrier and exfoliated before or after addition to the carrier to a desired platelet loading.

Polar organic compounds containing one or more hydroxy functionalities that are suitable for use as intercalate monomers and/or as the organic liquid carrier (matrix monomer) in accordance with the present invention include all alcohols, including aliphatic alcohols; aromatic alcohols; aryl substituted aliphatic alcohols; alkyl substituted aromatic alcohols; and polyhydric alcohols, such as the phenols.

Examples of suitable alcohols include, but are not limited to the following. Aliphatic alcohols, including: 1-hexanol; 1-heptanol; 1-octanol; 1-nonanol; 1-decanol; 1-undecanol; 1-dodecanol; 1-tridecanol; 1-tetradecanol; 1-pentadecanol; 1-hexadecanol; 1-heptadecanol; 1-octadecanol; 1-nonadecanol; 1-eicosanol; 1-hexacosanol; 1-hentriacontanol; 9-hexadecen-1-ol; 9-octadecen-1-ol; 10-eicosen-1-ol; 2-methyl-1-pentanol; 2-ethyl-1-butanol; 2-ethyl-1-hexanol; 3,5-dimethyl-1-hexanol; 2,2,4-trimethyl-1-pentanol; 4-methyl-2-pentanol; 2-octanol; 2,6-dimethyl-4-heptanol; and 2,6,8-trimethyl-4-nonanol.

Detergent range aliphatic alcohols include the $C_6$–$C_{24}$ alcohols, such as the $C_8$–$C_{18}$ alcohols manufactured from coconut, tallow and/or palm oils; $C_{16}$, $C_{18}$ oleyl alcohols; $C_9$–$C_{15}$ mixed alcohols, $C_6$–$C_{22}$ mixed alcohols; and $C_{13}$, $C_{15}$ alcohols manufactured from ethylene and other olefins. Additional detergent range alcohols include lauryl alcohol; myristyl alcohol; cetyl alcohol; tallow alcohol; stearyl alcohol; and oleyl alcohol. Branched detergent range alcohols, such as tridecyl alcohol ($C_{13}H_{28}O$), consisting predominantly of tetramethyl-1-nonanols also are suitable as the intercalant monomer and/or as a polar organic liquid carrier.

Plasticizer range alcohols include hexanol ($C_6H_{14}O$); 4-methyl-2-pentanol ($C_6H_{14}O$); octanol ($C_8H_{18}O$); isooctyl alcohol ($C_8H_{18}O$); 2-ethylhexanol ($C_8H18O$); isononyl alcohol ($C_9H_{20}O$); decanol ($C_{10}H_{22}O$); and tridecyl alcohol ($C_{13}H_{28}O$).

The nanocomposites containing one or more detergent range alcohols as the matrix monomer (the phyllosilicate platelets are dispersed in one or more detergent range alcohols as the polar organic liquid carrier) are useful, for example, the following industries shown in Table 1.

TABLE 1

| INDUSTRY | USE |
| --- | --- |
| detergent | emollient, foam control, opacifier, softener |
| petroleum and lubrication | drilling mud |
| agriculture | evaporation suppressant |
| plastics | mold-release agent, antifoam, emulsion polymerization agent, lubricant |
| textile | lubricant, foam control, anti-static agent, ink ingredient; fabric softeners |
| cosmetics | softener, emollient |
| pulp and paper | foam control |
| food | water evaporation suppressant |
| rubber | plasticizer, dispersant |
| paint and coatings | foam control |
| metal working | lubricant, rolling oil |
| mineral processing | flotation agent |

The plasticizer range alcohols are primarily used in plasticizers, e.g., for polyvinyl chloride (PVC) and other resins, but they also have a wide range of uses in other industrial and consumer products, as shown in Table 2.

TABLE 2

| INDUSTRY | USE |
| --- | --- |
| plastics | emulsion polymerization |
| petroleum and lubrication | defoamer |
| agriculture | stabilizer, tobacco sucker control, herbicide, fungicide |
| mineral processing | solvent, extractant, antifoam |
| textile | leveling agent, defoamer |
| coatings | solvent, smoothing agent |
| metal working | solvent, lubricant, protective coating |
| chemical processing | antifoam, solvent |
| food | moisturizer |
| cosmetics | perfume ingredient |

The plasticizer range alcohols have a number of other uses in plastics: hexanol and 2-ethylhexanol are used as part of the catalyst system in the polymerization of acrylates, ethylene, and propylene; the per-oxydicarbonate of 2-ethylhexanol is utilized as a polymerization initiator for vinyl chloride; various trialkyl phosphites find usage as heat and light stabilizers for plastics; organotin derivatives are used as heat stabilizers for PVC; octanol improves the compatibility of calcium carbonate fillers in various plastics; and 2-ethylhexanol is used to make expanded polystyrene beads.

A number of alcohols, particularly the $C_8$ materials, are employed to produce zinc dialkyldithiophosphates as lubricant antiwear additives. A small amount is used to make viscosity index improvements for lubricating oils. Various enhanced oil recovery processes utilize formulations containing hexanol or heptanol to displace oil from underground reservoirs; the alcohols and derivatives are also used as defoamers in oil production.

Plasticizer range alcohols such as 2-ethylhexanol and isoctyl alcohol, and surfactants made from these alcohols are used as emulsifiers and wetting agents for agricultural chemicals.

A number of surfactants are made from the plasticizer range alcohols, employing processes similar to those for the detergent range materials such as sulfation, ethoxylation, and amination. These surfactants find application primarily in industrial and commercial areas;: either amines and trialkyl amines are used in froth flotation of ores, and the alcohols are also used to dewater mineral concentrates or break emulsions.

The alcohols through $C_8$ have applications as specialty solvents, as do derivatives of linear and branched hexanols. Inks, coatings, and dyes for polyester fabrics are other application areas for 2-ethylhexanol. Trialkyl amines of the linear alcohols are used in solder fluxes, and hexanol is employed as a solvent in a soldering flux.

The polyhydric alcohols also are suitable as the intercalant monomer, and/or as the polar organic solvent (matrix monomer), in accordance with the present invention. Examples include (1) pentaerythritol, tetramethylolmethane

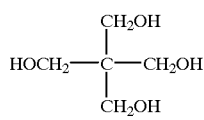

(2) dipentaerythritol

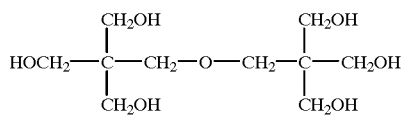

(3) tripentaerythritol

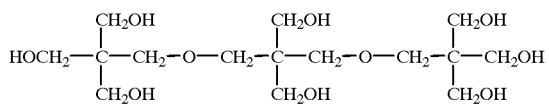

(4) trimethylolethane

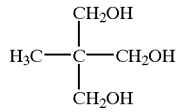

(5) trimethylolpropane

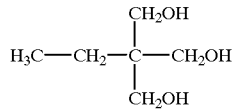

(6) ditrimethylolpropane

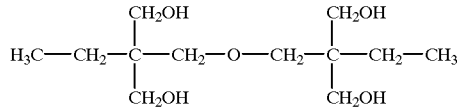

The most important industrial use of pentaerythritol is in a wide variety of paints, coatings, and varnishes, where the cross-linking capability of the four hydroxy groups is critical. Alkyd resins are produced by reaction of pentaerythritol with organic acids such as phthalic acid or maleic acid and natural oil species.

The resins obtained using pentaerythritol as the only alcohol group supplier are noted for high viscosity and fast drying characteristics. They also exhibit superior water and gasoline resistance, as well as improved film hardness and adhesion. The alkyd resin properties may be modified by replacing all or part of the pentaerythritol by glycols, glycerol, trimethylolethane, or trimethylolpropane, thereby reducing the functionality. Similarly, replacing the organic acid by longer-chain acids, such as adipic, or altering the quantities of the oil components (linseed, soya, and the like) modifies the drying, hardness, and wear characteristics of the final product. The catalyst and the actual cooking procedures also significantly affect overall resin characteristics.

Explosives formed by nitration of pentaerythritol to the tetranitrate using concentrated nitric acid are generally used as a filling in detonator fuses. Use of pentaerythritol containing small amounts of dipentaerythritol produces crystallization behavior that results in a high bulk density product having excellent free-flow characteristics, important for fuse burning behavior.

Pentaerythritol is used in self-extinguishing, nondripping, flame-retardant compositions with a variety of polymers, including olefins, vinyl acetate and alcohols, methyl methacrylate, and urethanes. Phosphorus compounds are added to the formulation of these materials. When exposed to fire, a thick foam is produced, forming a fire-resistant barrier.

Polymer compositions containing pentaerythritol are also used as secondary heat-, light-, and weather-resistant stabilizers with calcium, zinc, or barium salts, usually as the stearate, as the prime stabilizer. The polymers may be in plastic or fiber form.

Pentaerythritol and trimethylolpropane acrylic esters are useful in solventless lacquer formulations for radiation curing, providing a cross-linking capability for the main film component, which is usually in acrylic esters of urethane, epoxy, or polyester. Some specialty films utilize dipentaerythritol and ditrimethylolpropane.

Titanium dioxide pigment coated with pentaerythritol, trimethylolpropane, or trimethylolethane exhibits improved dispersion characteristics when used in paint or plastic formulations. The polyol is generally added at levels of about 0.1–0.5%.

Glycols also are suitable both as an intercalant monomer and as a polar organic solvent (matrix monomer) in accordance with the present invention. Glycerol is a particularly useful polyhydric alcohol since it is a safe food additive, as well as being otherwise in almost every industry.

Glycerol as a food is easily digested and nontoxic, and its metabolism places it with the carbohydrates, although it is present in combined form in all vegetable and animal fats. In flavoring and coloring products, glycerol acts as a solvent and its viscosity lends body to the product. It is used as a solvent, a moistening agent, and an ingredient of syrups as a vehicle. In candies and icings, glycerol retards crystallization of sugar. Glycerol is used as a heat-transfer medium in direct contact with foods in quick freezing, and as a lubricant in machinery used for food processing and packaging. The polyglycerols have increasing use in foods, particularly in shortenings and margarines.

In drugs and medicines, glycerol is an ingredient of many tinctures and elixirs, and glycerol of starch is used in jellies and ointments. It is employed in cough medicines and anesthetics, such as glycerol—phenol solutions, for ear treatments, and in bacteriological culture media. In cosmetics, glycerol is used in many creams and lotions to keep the skin soft and replace skin moisture. It is widely used in toothpaste to maintain the desired smoothness, viscosity, and lending a shine to the paste.

Meat casings and special types of papers, such as a glassine and greaseproof paper, need plasticizers to give them pliability and toughness; as such, glycerol is completely compatible with the base materials used, is absorbed by them, and does not crystallize or volatilize appreciably.

Glycerol can be used as a lubricant in places where an oil would fail. It is recommended for oxygen compressors because it is more resistant to oxidation than mineral oils. It is also used to lubricate pumps and bearings exposed to fluids such as gasoline and benzene, which would dissolve oil-type lubricants. In food, pharmaceutical, and cosmetic manufacture, where there is contact with a lubricant, glycerol may be used to replace oils.

Glycerol is often used as a lubricant because its high viscosity and ability to remain fluid at low temperatures make it valuable without modification. To increase its lubricating power, the exfoliated phyllosilicate platelets are dispersed in it. The viscosity of the nanocomposite may be decreased by addition of water, alcohol, or glycols, and increased by increased loading of phyllosilicate platelets. Pastes of such nanocomposite compositions may be used in packing pipe joints, in gas lines, or in similar applications. For use in high pressure gauges and valves, soaps are added to glycerol to increase its viscosity and improve its lubricating ability. A mixture of glycerin and glucose is employed as a nondrying lubricant in the die-pressing of metals. In the textile industry, glycerol is frequently used in connection with so-called textile oils, in spinning, knitting, and weaving operations.

Sheets and gaskets made with ground cork and glue require a plasticizer that has some humectant action in order that they may be pliable and tough. Glycerol is used because it has low vapor pressure, is not readily extractable by oils and greases, is readily absorbed by the cork, and is compatible with glue. With crown sealers and cork stoppers that come into contact with foods, it fulfills the additional requirement of nontoxicity.

Glycerol is used in cement compounds, caulking compounds, lubricants, and pressure media. It is also used in masking and shielding compounds, soldering compounds, and compasses; cleaning materials such as soaps, detergents, and wetting agents; emulsifiers and skin protectives used in industry; asphalt; ceramics; photographic products; leather and wood treatments; and adhesives.

The polyglycerols have many of the properties of glycerol. Diglycerol, $HOCH_2CHOHCH_2OCH_2CHOHCH_2OH$, is a viscous liquid (287 $mm^2/s$(=cSt) at 65.6° C.), about 25 times as viscous as glycerol. The polyglycerols offer greater flexibility and functionality than glycerol. Polyglycerols up to and including riacontaglycerol (30 condensed glycerol molecules) have been prepared commercially; the higher forms are solid. They are soluble in water, alcohol, and other polar solvents. They act as humectants, much like glycerol, but have progressively higher molecular weights and boiling points. Products of the present invention containing phyllosilicate platelets, based on polyglycerol matrix monomers, are useful in surface-active agents, plasticizers, adhesives, lubricants, antimicrobial agents, medical specialties and dietetic foods.

Glycols, such as ethylene glycol monomers as well as propylene glycol monomers; neopentyl glycol; 2,2,4-trimethyl-1,3-pentanediol; 1,4-cyclohexanedimethanol; and hydroxypivalyl hydroxypivalate are useful as the intercalant monomers and/or as the polar organic carrier (matrix monomer) in forming the nanocomposites of the present invention. Other suitable ethylene glycols include diethylene glycol; triethylene glycol; and tetraethylene glycol.

Triethylene glycol is an efficient hygroscopicity agent with low volatility, and is used as a liquid drying agent for natural gas. As a solvent, triethylene glycol is used in resin impregnants and other additives, steam-set printing inks, aromatic and paraffinic hydrocarbon separations, cleaning compounds, and cleaning poly(ethylene terephthalate) production equipment. The freezing point depression property of triethylene glycol is the basis for its use in heat-transfer fluids.

Triethylene glycol is used in some form as a vinyl plasticizer. The fatty acid derivatives of triethylene glycol are used as emulsifiers, demulsifiers, and lubricants. Polyesters derived from triethylene glycol are useful as low pressure laminates for glass fibers, asbestos, cloth, or paper. Triethylene glycol is used in the manufacture of alkyd resins used as laminating agents and in adhesives.

Tetraethylene glycol is miscible with water and many organic solvents. It is a humectant that, although less hygroscopic than the lower members of the glycol series, may find limited application in the dehydration of natural gases. Other uses are in moisturizing and plasticizing cork, adhesives, and other substances.

Tetraethylene glycol may be used directly as a plasticizer or modified by esterification with fatty acids to produce plasticizers. Tetraethylene glycol is used directly to plasticize separation membranes, such as silicone rubber, poly (vinyl acetate), and cellulose triacetate. Ceramic materials utilize tetraethylene glycol as plasticizing agents in resistant refractory plastics and molded ceramics. It is also employed to improve the physical properties of cyanoacrylate and polyacrylonitrile adhesives, and is chemically modified to form polyisocyanate, polymethacrylate, and to contain silicone compounds used for adhesives.

Propylene glycol is commonly found in foods, pharmaceuticals, cosmetics, and other applications involving possible ingestion or absorption through the skin. An industrial grade of propylene glycol is usually specified for other uses. In common with most other glycols, propylene glycol is odorless and colorless, and has a wide range of solvency for organic materials, besides being completely water-soluble. Propylene glycol is also a known antimicrobial and is an effective food preservative.

Propylene glycol is an important solvent for aromatics in the flavor concentrate industry, enabling manufacturers to produce low cost flavor concentrates of high quality. It is also an excellent wetting agent for natural gums, greatly simplifying the compounding of citrus and other emulsified flavors. Propylene glycol also finds use as a solvent in elixirs and pharmaceutical preparations containing some water-soluble ingredients, and as a solvent in the formulation of sunscreen lotion, shampoos, shaving creams, and other similar products.

Aqueous solutions of propylene glycol display excellent antifreeze properties and are therefore valuable as low temperature heat-transfer fluids. These fluids are commonly used in the brewing and dairy industries as well as in refrigerated display cases in retail grocery stores. Propylene glycol is also an effective humectant, preservative, and stabilizer and is found in such diverse applications as semi-moist pet food, bakery goods, food flavorings, salad dressings, and shave creams. It is also used as a solvent and plasticizer in printing inks, as a preservative in floral arrangements, and as a stabilizer in hydraulic fluids. Heat-transfer fluids used in commercial and industrial building heating and cooling systems, chemical plants, stationary engines, and solar heat recovery can be formulated with the industrial grade of propylene glycol.

The greater solvency of dipropylene glycol for castor oil indicates its usefulness as a component of hydraulic brake fluid formulations; its affinity for certain other oils has likewise led to its use in cutting oils, textile lubricants, and industrial soaps. Fragrance or low odor grades of dipropylene glycol are established standard base formulating solvents in the fragrance industry and for some personal care products, such as deodorants.

Tripropylene glycol is an excellent solvent in many applications where other glycols fail to give satisfactory results. Its ability to solubilize printing ink resins makes tripropylene glycol useful in creams designed to remove ink stains from the hands. A combination of water solubility and good solvent power for many organic compounds plus low volatility and a high boiling point also have led to its use by formulators of textile soaps and lubricants, cutting oil concentrates, and many similar products.

The polyurethane industry provides other uses for neopentyl glycol as an intermediate in the manufacture of hydroxy-terminated polyester polyols. Beginning with basically the same ingredients, products with a wide range of properties, varying from soft to rigid foams to elastomers and adhesives may be produced from polyols based on neopentyl glycol. This glycol also is employed to improve thermal, hydrolytic, and uv stability.

Synthetic lubricants are made with neopentyl glycol in the base-stock polyester. Excellent thermal stability and viscosity control are imparted to special high performance aviation lubricants by the inclusion of polyester thickening agents made from neopentyl glycol. Neopentyl glycol is also used to manufacture polymeric plasticizers that exhibit the improved thermal, hydrolytic, and uv stability necessary for use in some exterior applications.

Trimethylpentanediol is used in hard-surface cleaners as a coupling agent and in temporary or semipermanent hair dyes. Other applications involving trimethylpentanediol, or a derivative, are in urethane elastomers, in foams, as a reactive diluent in urethane coatings, as a sound-insulating, glass-laminate adhesive, as a bactericide-fungicide, and as a cross-linking agent in poly(vinyl chloride) adhesives.

Another area in which 1,4-cyclohexanedimethanol is commercially important is in the manufacture of polyurethane foams. The two primary hydroxyl groups provide fast reaction rates with diisocyanates, which makes this diol attractive for use as a curative in foams. It provides latitude in improving physical properties of the foam, in particular the load-bearing properties. Generally, the ability to carry a load increases with the amount of 1,4-cyclohexanedimethanol used in producing the high resilience foam. Other polyurethane derivatives of 1,4-cyclohexanedimethanol include elastomers useful for synthetic rubber products with a wide range of hardness and elasticity.

Hydroxypivalyl hydroxypivalate or 3-hydroxy-2,2-dimethylpropyl 3-hydroxy-2,2-dimethylpropionate is a white crystalline solid at room temperature. It is used to manufacture polyester resins for use in surface coatings where good resistance to weathering and acid rain are of particular importance.

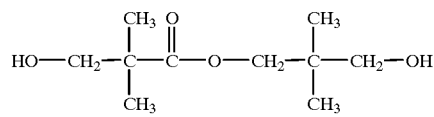

Hydroxypivalyl hydroxypivalate is soluble in most alcohols, ester solvents, ketones, and aromatic hydrocarbons. It is partially soluble in water.

The phenols also function as hydroxy-functional polar organic compounds suitable as the intercalant monomer, and/or as a polar organic liquid carrier, including the alkylphenols, chlorophenols, cresols, hydroquinone, resorcinol, pyrocatechol, polyhydroxybenzenes, and the monomeric phenolic aldehydes, phenolic ethers, and aminophenols, which have one or more hydroxyl groups attached to an aromatic ring. Examples of suitable phenolic aldehydes, phenolic ethers and aminophenols are as follows:
Representative Monohydric Phenolic Aldehydes:
o-hydroxybenzaldehyde;
p-methoxybenzaldehyde;
2-hydroxy-p-tolualdehyde;
4-hydroxy-o-tolualdehyde;
6-hydroxy-m-tolualdehyde; and
4-hydroxy-m-tolualdehyde.
Representative Dihydric Phenolic Aldehydes:
3,4-dihydroxybenzaldehyde;
4-hydroxy-3-methoxybenzaldehyde;
3,4-dimethoxybenzaldehyde heliotropin;
3,4-methylenedioxybenzaldehyde bourbonal;
3-ethoxy-4-hydroxybenzaldehyde;
3-hydroxy-4-methoxybenzaldehyde;
2-hydroxy-3-methoxybenzaldehyde;
2,5-dihydroxybenzaldehyde; and
2,4-diformyl-6-methoxyphenol.
Representative Trihydric Phenolic Aldehydes:
4-hydroxy-3,5-dimethoxybenzaldehyde.
Representative Polycyclic Phenolic Aldehydes:
1-formyl-2-naphthol;
4-formyl-1-naphthol;
2-formyl-1-naphthol;
3-formyl-1-naphthol; and
2-anthrol-1-aldehyde.
Representative Phenolic Esters
methoxybenzene;
4-methoxytoluene;
ethoxybenzene;
1-methoxy-4-propenylbenzene;
1-allyl-4-methoxybenzene; phenyl ether;
2-methoxyphenol;
1,2-dimethoxybenzene;
1-allyl-3,4-dimethoxybenzene; eugenol;
1-hydroxyl-2-methoxy-4-cis-propenylbenzene;
1-hydroxyl-2-methoxy-4-trans-propenylbenzene;
safrole;
isosafrole;
4-methoxyphenol;
4-benzyloxyphenol;
1,4-dimethoxybenzene;
2-ethoxynaphthalene; and
2-methoxynaphthalene.

Salts of the above aminophenols also are suitable, such as the following: hydrochloride; hydroiodide; oxalate; acetate, chloroacetate; trichloroacetate; sulfate; and hydrosulfate. The 2- and 4-aminophenols are strong reducing agents and can function in nanocomposites as corrosion inhibitors in paints. Both 2-aminophenol and 4-aminophenol are useful as a shading agent for leather, fur and hair; 3-aminophenol is useful as a stabilizer for chlorinated thermoplastic polymers. Derivatives include: 2-amino-4-nitrophenol; 2-amino-4,6-dinitrophenol; 2-amino-4,6-dichlorophenol; 3-(N,N-dimethylamino)phenol; 3-(N-methylamino)phenol; 3-(N,N-diethylamino)phenol; 3-(N-phenylamino)phenol; 4-amino-2-hydroxybenzoic acid; 4-(N-methylamino)phenol; 4-(N,N-dimethylamino)phenol; 4-hydroxyacetanilide; 4-ethoxyacetanilide; and N-(4-hydroxyphenyl)glycine.

| Representative Aminophenols And Their Salts And Derivatives | |
| --- | --- |
| 2-aminophenol | 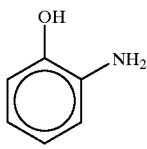 |
| 3-aminophenol | 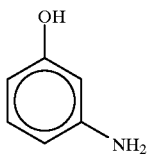 |
| 4-aminophenol | 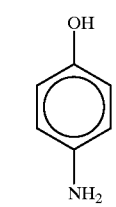 |

In accordance with another embodiment of the present invention, the intercalates can be exfoliated and dispersed into one or more melt-processible thermoplastic and/or thermosetting matrix oligomers or polymers, or mixtures thereof. Matrix polymers for use in this embodiment of the process of this invention may vary widely, the only requirement is that they are melt processible. In this embodiment of the invention, the polymer includes at least ten (10), preferably at least thirty (30) recurring monomeric units. The upper limit to the number of recurring monomeric units is not critical, provided that the melt index of the matrix polymer under use conditions is such that the matrix polymer forms a flowable mixture. Most preferably, the matrix polymer includes from at least about 10 to about 100 recurring monomeric units. In the most preferred embodiments of this invention, the number of recurring units is such that the matrix polymer has a melt index of from about 0.01 to about 12 grams per 10 minutes at the processing temperature.

Thermoplastic resins and rubbers for use as matrix polymers in the practice of this invention may vary widely. Illustrative of useful thermoplastic resins, which may be used alone or in admixture, are polyactones such as poly (pivalolactone), poly(caprolactone) and the like; polyurethanes derived from reaction of diisocyanates such as 1,5-naphthalene diisocyanate; p-phenylene diisocyanate, m-phenylene diisocyanate, 2,4-toluene diisocyanate, 4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyanatodiphenylmethane and the like and linear long-chain diols such as poly(tetramethylene adipate), poly (ethylene adipate), poly(1,4-butylene adipate), poly (ethylene succinate), poly(2,3-butylene succinate), polyether diols and the like; polycarbonates such as poly [methane bis(4-phenyl) carbonate], poly[1,1-ether bis(4-phenyl) carbonate], poly[diphenylmethane bis(4-phenyl) carbonate], poly[1,1-cyclohexane bis(4-phenyl)carbonate] and the like; polysulfones; polyethers; polyketones; polyamides such as poly(4-amino butyric acid), poly (hexamethylene adipamide), poly(6-aminohexanoic acid), poly(m-xylylene adipamide), poly(p-xylylene sebacamide), poly(2,2,2-trimethyl hexamethylene terephthalamide), poly (metaphenylene isophthalamide) (NOMEX), poly(p-phenylene terephthalamide) (KEVLAR), and the like; polyesters such as poly(ethylene azelate), poly(ethylene-1,5-naphthalate, poly(1,4-cyclohexane dimethylene terephthalate), poly(ethylene oxybenzoate) (A-TELL), poly (para-hydroxy benzoate) (EKONOL), poly(1,4-cyclohexylidene dimethylene terephthalate) (KODEL) (as), poly(1,4-cyclohexylidene dimethylene terephthalate) (Kodel) (trans), polyethylene terephthalate, polybutylene terephthalate and the like; poly(arylene oxides) such as poly(2,6-dimethyl-1,4-phenylene oxide), poly(2,6-diphenyl-1,4-phenylene oxide) and the like; poly(arylene sulfides) such as poly(phenylene sulfide) and the like; polyetherimides; vinyl polymers and their copolymers such as polyvinyl acetate, polyvinyl alcohol, polyvinyl chloride; polyvinyl butyral, polyvinylidene chloride, ethylene-vinyl acetate copolymers, and the like; polyacrylics, polyacrylate and their copolymers such as polyethyl acrylate, poly(n-butyl acrylate), polymethylmethacrylate, polyethyl methacrylate, poly(n-butyl methacrylate), poly(n-propyl methacrylate), polyacrylamide, polyacrylonitrile, polyacrylic acid, ethylene-acrylic acid copolymers, ethylene-vinyl alcohol copolymers acrylonitrile copolymers, methyl methacrylate-styrene copolymers, ethylene-ethyl acrylate copolymers, methacrylated butadiene-styrene copolymers and the like; polyolefins such as low density poly(ethylene), poly(propylene), chlorinated low density poly(ethylene), poly(4-methyl-1-pentene), poly(ethylene), poly(styrene), and the like; ionomers; poly(epichlorohydrins); poly (urethane) such as the polymerization product of diols such as glycerin, trimethylol-propane, 1,2,6-hexanetriol, sorbitol, pentaerythritol, polyether polyols, polyester polyols and the like with a polyisocyanate such as 2,4-tolylene diisocyanate, 2,6-tolylene diisocyante, 4,4'-diphenylmethane diisocyanate, 1,6-hexamethylene diisocyanate, 4,4'-dicyclohexylmethane diisocyanate and the like; and polysulfones such as the reaction product of the sodium salt of 2,2-bis(4-hydroxyphenyl) propane and 4,4'-dichlorodiphenyl sulfone; furan resins such as poly(furan); cellulose ester plastics such as cellulose acetate, cellulose acetate butyrate, cellulose propionate and the like; silicones such as poly(dimethyl siloxane), poly(dimethyl siloxane), poly(dimethyl siloxane co-phenylmethyl siloxane), and the like; protein plastics; and blends of two or more of the foregoing.

Vulcanizable and thermoplastic rubbers useful as matrix polymers in the practice of this embodiment of the invention may also vary widely. Illustrative of such rubbers are brominated butyl rubber, chlorinate butyl rubber, polyurethane elastomers, fluoroelastomers, polyester elastomers, polyvinylchloride, butadiene/acrylonitrile elastomers, silicone elastomers, poly(butadiene), poly(isobutylene), ethylene-propylene copolymers, ethylene-propylene-diene terpolymers, sulfonated ethylene-propylene-diene terpolymers, poly(chloroprene), poly(2,3-dimethylbutadiene), poly(butadiene-pentadiene), chlorosulphonated poly(ethylenes), poly(sulfide) elastomers, block copolymers, made up of segments of glassy or crystalline blocks such as poly(styrene), poly(vinyl-toluene), poly(t-butyl styrene), polyesters and the like and the elastomeric blocks such as poly(butadiene), poly(isoprene), ethylene-propylene copolymers, ethylene-butylene copolymers, polyether and the like as for example the copolymers in poly(styrene)-poly(butadiene)-poly(styrene) block copolymer manufactured by Shell Chemical Company under the trade name KRATON®.

Useful thermosetting resins useful as matrix polymers include, for example, the polyamides; polyalkylamides; polyesters; polyurethanes; polycarbonates; polyepoxides; and mixtures thereof.

Most preferred thermoplastic polymers for use as a matrix polymer are thermoplastic polymers such as polyamides, polyesters, and polymers of alpha-beta unsaturated monomers and copolymers. Polyamides which may be used in the process of the present invention are synthetic linear polycarbonamides characterized by the presence of recurring carbonamide groups as an integral part of the polymer chain which are separated from one another by at least two carbon atoms. Polyamides of this type include polymers, generally known in the art as nylons, obtained from diamines and dibasic acids having the recurring unit represented by the general formula:

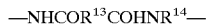

—NHCOR$^{13}$COHNR$^{14}$— in which R$^{13}$ is an alkylene group of at least 2 carbon atoms, preferably from about 2 to about 11, or arylene having at least about 6 carbon atoms, preferably about 6 to about 17 carbon atoms; and R$^{14}$ is selected from R$^{13}$ and aryl groups. Also, included are copolyamides and terpolyamides obtained by known methods, for example, by condensation of hexamethylene diamine and a mixture of dibasic acids consisting of terephthalic acid and adipic acid. Polyamides of the above description are well-known in the art and include, for example, the copolyamide of 30% hexamethylene diammonium isophthalate and 70% hexamethylene diammonium adipate, poly(hexamethylene adipamide) (nylon 6,6), poly(hexamethylene sebacamide) (nylon 6, 10), poly(hexamethylene isophthalamide), poly(hexamethylene terephthalamide), poly(heptamethylene pimelamide) (nylon 7,7), poly(octamethylene suberamide) (nylon 8,8), poly(nonamethylene azelamide) (nylon 9,9) poly(decamethylene azelamide) (nylon 10,9), poly(decamethylene sebacamide) (nylon 10,10), poly[bis(4-amino cyclohexyl)methane-1,10-decane-carboxamide)], poly(m-xylylene adipamide), poly(p-xylylene sebacamide), poly(2,2,2-trimethyl hexamethylene terephthalamide), poly(piperazine sebacamide), poly(p-phenylene terephthalamide), poly(metaphenylene isophthalamide) and the like.

Other useful polyamides for use as a matrix polymer are those formed by polymerization of amino acids and derivatives thereof, as, for example, lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like.

Preferred polyamides for use as a matrix polymer are poly(caprolactam), poly(12-aminododecanoic acid) and poly(hexamethylene adipamide).

Other matrix or host polymers which may be employed in admixture with exfoliates to form nanocomposites are linear polyesters. The type of polyester is not critical and the particular polyesters chosen for use in any particular situation will depend essentially on the physical properties and features, i.e., tensile strength, modulus and the like, desired in the final form. Thus, a multiplicity of linear thermoplastic polyesters having wide variations in physical properties are suitable for use in admixture with exfoliated layered material platelets in manufacturing nanocomposites in accordance with this invention.

The particular polyester chosen for use as a matrix polymer can be a homo-polyester or a co-polyester, or mixtures thereof, as desired. Polyesters are normally prepared by the condensation of an organic dicarboxylic acid and an organic diol, and, the reactants can be added to the intercalates, or exfoliated intercalates for in situ polymerization of the polyester while in contact with the layered material, before or after exfoliation of the intercalates.

Polyesters which are suitable for use as matrix polymers in this embodiment of the invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters.

Exemplary of useful cycloaliphatic, aliphatic and aromatic polyesters which can be utilized as matrix polymers in the practice of this embodiment of the invention are poly(ethylene terephthalate), poly(cyclohexylenedimethylene terephthalate), poly(ethylene dodecate), poly(butylene terephthalate), poly[ethylene(2,7-naphthalate)], poly(methaphenylene isophthalate), poly(glycolic acid), poly(ethylene succinate), poly(ethylene adipate), poly(ethylene sebacate), poly(decamethylene azelate), poly(ethylene sebacate), poly(decamethylene adipate), poly(decamethylene sebacate), poly(dimethylpropiolactone), poly(para-hydroxybenzoate) (EKONOL), poly(ethylene oxybenzoate) (A-tell), poly(ethylene isophthalate), poly(tetramethylene terephthalate, poly(hexamethylene terephthalate), poly(decamethylene terephthalate), poly(1,4-cyclohexane dimethylene terephthalate) (trans), poly(ethylene 1,5-naphthalate), poly(ethylene 2,6-naphthalate), poly(1,4-cyclohexylidene dimethylene terephthalate), (KODEL) (cis), and poly(1,4-cyclohexylidene dimethylene terephthalate (KODEL) (trans).

Polyester compounds prepared from the condensation of a diol and an aromatic dicarboxylic acid are especially suitable as matrix polymers in accordance with this embodiment of the present invention. Illustrative of such useful aromatic carboxylic acids are terephthalic acid, isophthalic acid and o-phthalic acid, 1,3-naphthalenedicarboxylic acid, 1,4-naphthalenedicarboxylic acid, 2,6-naphthalenedicarboxylic acid, 2,7-naphthalenedicarboxylic acid, 4,4'-diphenyldicarboxylic acid, 4,4'-diphenylsulfone-dicarboxylic acid, 1,1,3-trimethyl-5-carboxy-3-(p-carboxyphenyl)-idane, diphenyl ether 4,4'-dicarboxylic acid, bis-p(carboxyphenyl) methane and the like. Of the aforementioned aromatic dicarboxylic acids, those based on a benzene ring (such as terephthalic acid, isophthalic acid, orthophthalic acid) are preferred for use in the practice of this invention. Among these preferred acid precursors, terephthalic acid is particularly preferred acid precursor.

The most preferred matrix polymer for incorporation with exfoliates manufactured in accordance with the present invention is a polymer selected from the group consisting of poly(ethylene terephthalate), poly(butylene terephthalate), poly(1,4-cyclohexane dimethylene terephthalate), a polyvinylimine, and mixtures thereof. Among these polyesters of choice, poly(ethylene terephthalate) and poly (butylene terphthalate) are most preferred.

Still other useful thermoplastic homopolymers and copolymer matrix polymers for forming nanocomposites with the exfoliates of the present invention are polymers formed by polymerization of alpha-beta-unsaturated monomers or the formula:

$$R^{15}R^{16}C=CH_2$$

wherein:

$R^{15}$ and $R^{16}$ are the same or different and are cyano, phenyl, carboxy, alkylester, halo, alkyl, alkyl substituted with one or more chloro or fluoro, or hydrogen. Illustrative of such preferred homopolymers and copolymers are homopolymers and copolymers of ethylene, propylene, vinyl alcohol, acrylonitrile, vinylidene chloride, esters of acrylic acid, esters of methacrylic acid, chlorotrifluoroethylene, vinyl chloride and the like. Preferred are poly(propylene), propylene copolymers, poly(ethylene) and ethylene copolymers. More preferred are poly(ethylene) and poly (propylene).

The mixture may include various optional components which are additives commonly employed with polar organic liquids. Such optional components include nucleating agents, fillers, plasticizers, impact modifiers, chain extenders, plasticizers, colorants, mold release lubricants, antistatic agents, pigments, fire retardants, and the like. These optional components and appropriate amounts are well known to those skilled in the art.

The amount of intercalated and/or exfoliated layered material included in the liquid carrier or solvent compositions to form the viscous compositions suitable to deliver the carrier or some carrier-dissolved or carrier-dispersed active material, such as a pharmaceutical, may vary widely depending on the intended use and desired viscosity of the composition. For example, relatively higher amounts of intercalates, i.e., from about 10% to about 30% by weight of the total composition, are used in forming solvent gels having extremely high viscosities, e.g., 5,000 to 5,000,000 centipoises. Extremely high viscosities, however, also can be achieved with a relatively small concentration of intercalates and/or exfoliates thereof, e.g., 0.1% to 5% by weight, by adjusting the pH of the composition in the range of about 0–6 or about 10–14 and/or by heating the composition above room temperature, e.g., in the range of about 25° C. to about 200° C., preferably about 75° C. to about 100° C. It is preferred that the intercalate or platelet loading be less than about 10% by weight of the composition. Intercalate or platelet particle loadings within the range of about 0.01% to about 40% by weight, preferably about 0.05% to about 20%, more preferably about 0.5% to about 10% of the total weight of the composition significantly increases the viscosity of the composition. In general, the amount of intercalate and/or platelet particles incorporated into the carrier/solvent is less than about 20% by weight of the total composition, and preferably from about 0.05% to about 20% by weight of the composition, more preferably from about 0.01% to about 10% by weight of the composition, and most preferably from about 0.01% to about 5%, based on the total weight of the composition.

In accordance with an important feature of the present invention, the intercalate and/or platelet/carrier compositions of the present invention can be manufactured in a concentrated form, e.g., as a master gel, e.g, having about 10–90%, preferably about 20–80% intercalate and/or exfoliated platelets of layered material and about 10–90%, preferably about 20–80% carrier/solvent. The master gel can be later diluted and mixed with additional carrier or solvent to reduce the viscosity of the composition to a desired level.

The intercalates, and/or exfoliates thereof, are mixed with a carrier or solvent to produce viscous compositions of the carrier or solvent optionally including one or more active compounds, such as an antiperspirant compound, dissolved or dispersed in the carrier or solvent.

In accordance with an important feature of the present invention, a wide variety of topically-active compounds can be incorporated into a stable composition of the present invention. Such topically active compositions include cosmetic, industrial, and medicinal compounds that act upon contact with the skin or hair, or are used to adjust rheology of industrial greases and the like. In accordance with another important feature of the present invention, a topically-active compound can be solubilized in the composition of the present invention or can be homogeneously dispersed throughout the composition as an insoluble, particulate material. In either case topically-effective compositions of the present invention are resistant to composition separation and effectively apply the topically-active compound to the skin or hair. If required for stability, a surfactant can be included in the composition, such as any disclosed in Laughlin, et al. U.S. Pat. No. 3,929,678, hereby incorporated by reference. In general, the topically-effective compositions of the present invention demonstrate essentially no phase separation if the topically-active compound is solubilized in the compositions. Furthermore, if the topically-active compound is insoluble in the composition, the composition demonstrates essentially no phase separation.

The topically-active compounds can be a cosmetically-active compound, a medically-active compound or any other compound that is useful upon application to the skin or hair. Such topically-active compounds include, for example, antiperspirants, antidandruff agents, antibacterial compounds, antifungal compounds, anti-inflammatory compounds, topical anesthetics, sunscreens and other cosmetic and medical topically-effective compounds.

Therefore, in accordance with an important feature of the present invention, the stable topically-effective composition can include any of the generally-known antiperspirant compounds such as finely-divided solid astringent salts, for example, aluminum chlorohydrate, aluminum chlorohydrox, zirconium chlorohydrate, and complexes of aluminum chlorohydrate with zirconyl chloride or zirconyl hydroxychloride. In general, the amount of the antiperspirant compound, such as aluminum zirconium tetrachlorohydrex glycine in the composition can range from about 0.01% to about 50%, and preferably from about 0.1% to about 30%, by weight of the total composition.

Other topically-active compounds can be included in the compositions of the present invention in an amount sufficient to perform their intended function. For example, zinc oxide, titanium dioxide or similar compounds can be included if the composition is intended to be a sunscreen. Similarly, topically-active drugs, like antifungal compounds; antibacterial compounds; anti-inflammatory compounds; topical anesthetics; skin rash, skin disease and dermatitis medications; and anti-itch and irritation-reducing compounds can be included in the compositions of the present invention. For example, analgesics such as benzocaine, dyclonine hydrochloride, aloe vera and the like; anesthetics such as butamben picrate, lidocaine hydrochloride, zylocaine and the like; antibacterials and antiseptics, such as povidone-iodine, polymyxin b sulfatebacitracin, zinc-neomycin sulfate-hydrocortisone, chloramphenicol, methylbenzethonium chloride, and erythromycin and the like; antiparasitics, such as lindane; deodorants, such as chlorophyllin copper complex, aluminum chloride, aluminum chloride hexahydrate, and methylbenzethonium chloride; essentially all dermatologicals, like acne preparations, such as benzoyl peroxide, erythromycin-benzoyl peroxide, clindamycin phosphate, 5,7-dichloro-8-hydroxyquinoline, and the like; anti-inflammatory agents, such as alclometasone dipropionate, betamethasone valerate, and the like; burn relief ointments, such as o-amino-p-toluenesulfonamide monoacetate and the like; depigmenting agents, such as monobenzone; dermatitis relief agents, such as the active steroids amcinonide, diflorasone diacetate, hydrocortisone, and the like; diaper rash relief agents, such as methylbenzethonium chloride and the like; emollients and moisturizers, such as mineral oil, PEG-4 dilaurate, lanolin oil, petrolatum, mineral wax and the like; fungicides, such as butocouazole nitrate, haloprogin, clotrimazole, and the like; herpes treatment drugs, such as 9-[(2-hydroxyethoxy)methyl]guanine; pruritic medications, such as alclometasone dipropionate, betamethasone valerate, isopropyl myristate MSD, and the like; psoriasis, seborrhea and scabicide agents, such as anthralin, methoxsalen, coal tar and the like; sunscreens, such as octyl p-(dimethylamino)benzoate, octyl methoxycinnamate, oxybenzone and the like; steroids, such as 2-(acetyloxy)-9-fluoro-1',2',3',4'-tetrahydro-11-hydroxypregna-1,4-dieno[16,17-b] naphthalene-3,20-dione, and 21-chloro-9-fluoro-1',2',3',4'-tetrahydro-11b-hydroxypregna-1,4-dieno[16z,17-b]naphthalene-3,20-dione. Any other medication capable of topical administration also can be incorporated in composition of the present invention in an amount sufficient to perform its intended function.

Eventual exfoliation of the intercalated layered material should provide delamination of at least about 90% by weight of the intercalated material to provide a more viscous composition comprising a carrier or solvent having monomer-complexed platelet particles substantially homogeneously dispersed therein. Some intercalates require a shear rate that is greater than about 10 sec$^{-1}$ for such relatively thorough exfoliation. Other intercalates exfoliate naturally or by heating, or by applying low pressure, e.g., 0.5 to 60 atmospheres above ambient, with or without heating. The upper limit for the shear rate is not critical. In the particularly preferred embodiments of the invention, when shear is employed for exfoliation, the shear rate is from greater than about 10 sec$^{-1}$ to about 20,000 sec$^{-1}$, and in the more preferred embodiments of the invention the shear rate is from about 100 sec$^{-1}$ to about 10,000 sec$^{-1}$.

When shear is employed for exfoliation, any method which can be used to apply a shear to the intercalant/carrier composition can be used. The shearing action can be provided by any appropriate method, as for example by mechanical means, by thermal shock, by pressure alteration, or by ultrasonics, all known in the art. In particularly useful procedures, the composition is sheared by mechanical methods in which the intercalate, with or without the carrier or solvent, is sheared by use of mechanical means, such as stirrers, Banbury® type mixers, Brabender® type mixers, long continuous mixers, and extruders. Another procedure employs thermal shock in which shearing is achieved by alternatively raising or lowering the temperature of the composition causing thermal expansions and resulting in internal stresses which cause the shear. In still other procedures, shear is achieved by sudden pressure changes in pressure alteration methods; by ultrasonic techniques in which cavitation or resonant vibrations which cause portions of the composition to vibrate or to be excited at different phases and thus subjected to shear. These methods of shearing are merely representative of useful methods, and any method known in the art for shearing intercalates may be used.

Mechanical shearing methods may be employed such as by extrusion, injection molding machines, Banbury® type mixers, Brabender® type mixers and the like. Shearing also can be achieved by introducing the layered material and intercalant monomer at one end of an extruder (single or double screw) and receiving the sheared material at the other end of the extruder. The temperature of the layered material/intercalant monomer composition, the length of the extruder, residence time of the composition in the extruder and the design of the extruder (single screw, twin screw, number of flights per unit length, channel depth, flight clearance, mixing zone, etc.) are several variables which control the amount of shear to be applied for exfoliation.

Exfoliation should be sufficiently thorough to provide at least about 80% by weight, preferably at least about 85% by weight, more preferably at least about 90% by weight, and most preferably at least about 95% by weight delamination of the layers to form two monomer layer tactoids that include three platelets or, more preferably, individual platelet particles that can be substantially homogeneously dispersed in the carrier or solvent. As formed by this process, the platelet particles or platelet multi-layer tactoids dispersed in the carrier or solvent have the thickness of the individual layers plus one to five monolayer thicknesses of complexed monomer, or small multiples less than about 10, preferably less than about 5 and more preferably less than about 3 of the layers, and still more preferably 1 or 2 layers. In the preferred embodiments of this invention, intercalation and delamination of every interlayer space is complete so that all or substantially all individual layers delaminate one from the other to form separate platelet particles for admixture with the carrier or solvent. The compositions can include the layered material as all intercalate, completely without exfoliation, initially to provide relatively low viscosities for transportation and pumping until it is desired to increase viscosity via easy exfoliation. In cases where intercalation is incomplete between some layers, those layers will not delaminate in the carrier or solvent, and will form platelet particles comprising those layers in a coplanar aggregate.

The effect of adding into a polar organic liquid carrier the nanoscale particulate dispersed platelet particles, derived from the intercalates formed in accordance with the present invention, typically is an increase in viscosity.

Molding compositions comprising a thermoplastic or thermosetting polymer containing a desired loading of platelets obtained from exfoliation of the intercalates manufactured according to the invention are outstandingly suitable for the production of sheets and panels having valuable properties. Such sheets and panels may be shaped by conventional processes such as vacuum processing or by hot pressing to form useful objects. The sheets and panels according to the invention are also suitable as coating materials for other materials comprising, for example, wood, glass, ceramic, metal or other plastics, and outstanding strengths can be achieved using conventional adhesion promoters, for example, those based on vinyl resins. The sheets and panels can also be laminated with other plastic films and this is preferably effected by co-extrusion, the sheets being bonded in the molten state. The surfaces of the sheets and panels, including those in the embossed form, can be improved or finished by conventional methods, for example by lacquering or by the application of protective films.

Matrix polymer/platelet composite materials are especially useful for fabrication of extruded films and film laminates, as for example, films for use in food packaging. Such films can be fabricated using conventional film extrusion techniques. The films are preferably from about 10 to about 100 microns, more preferably from about 20 to about 100 microns and most preferably from about 25 to about 75 microns in thickness.

The homogeneously distributed platelet particles, exfoliated in accordance with the present invention, and matrix polymer that form the nanocomposites of one embodiment of the present invention are formed into a film by suitable film-forming methods. Typically, the composition is melted and forced through a film forming die. The film of the nanocomposite may go through steps to cause the platelets to be further oriented so the major plates through the platelets are substantially parallel to the major plane through the film. A method to do this is to biaxially stretch the film. For example, the film is stretched in the axial or machine direction by tension rollers pulling the film as it is extruded from the die. The film is simultaneously stretched in the transverse direction by clamping the edges of the film and drawing them apart. Alternatively, the film is stretched in the transverse direction by using a tubular film die and blowing the film up as it passes from the tubular film die. The films may exhibit one or more of the following benefits: increased modulus; increased wet strength; increased dimensional stability; decreased moisture adsorption; decreased permeability to gases such as oxygen and liquids, such as water, alcohols and other solvents.

The following specific examples are presented to more particularly illustrate the invention and are not to be construed as limitations thereon.

Figure 5:
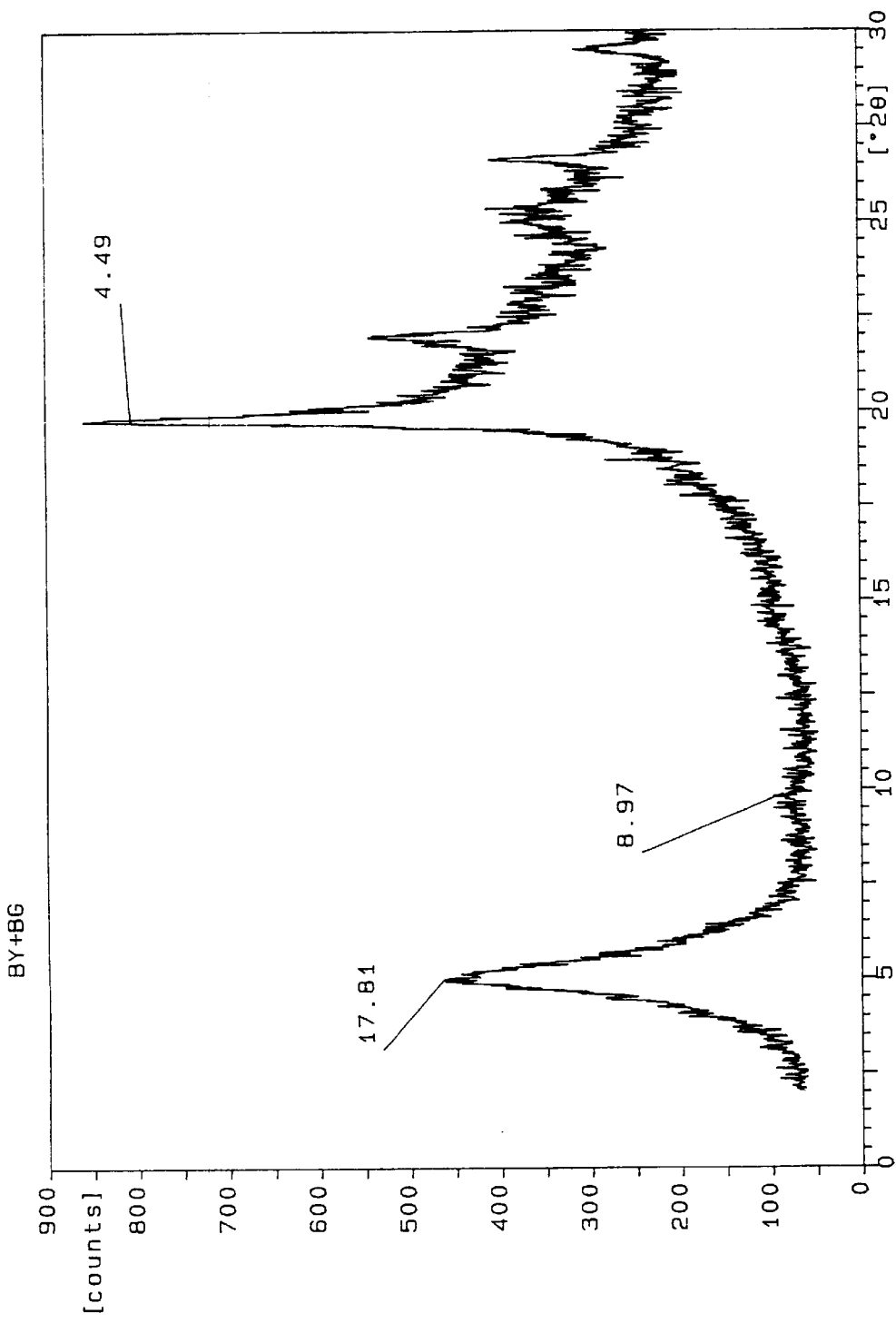
FIG. 5 is an x-ray diffraction pattern for a mixture of butylene glycol and sodium montmorillonite.
Figure 6:
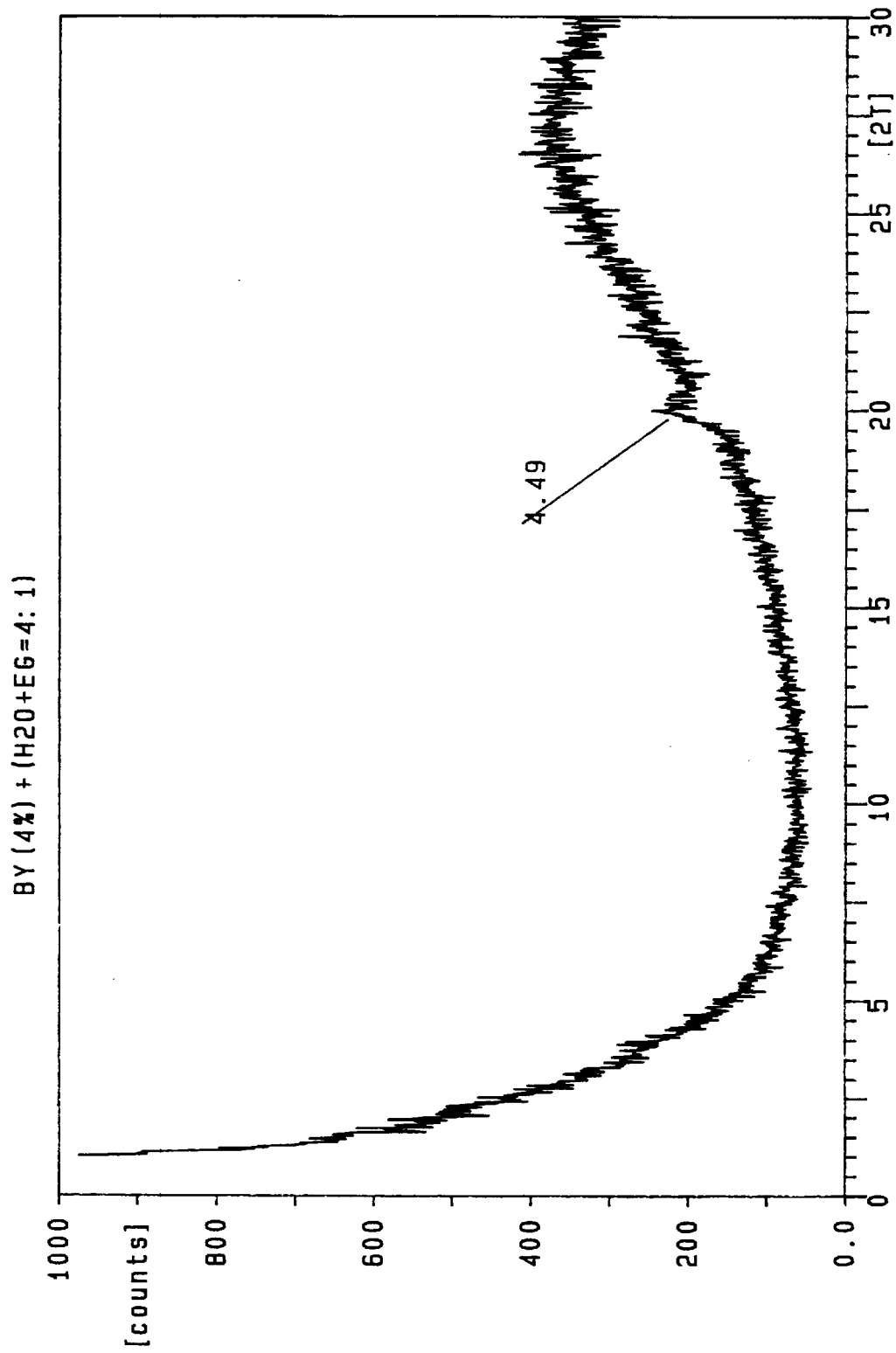
FIG. 6 is an x-ray diffraction pattern of the mixture shown in FIG. 4, after exfoliation.
Figure 7:
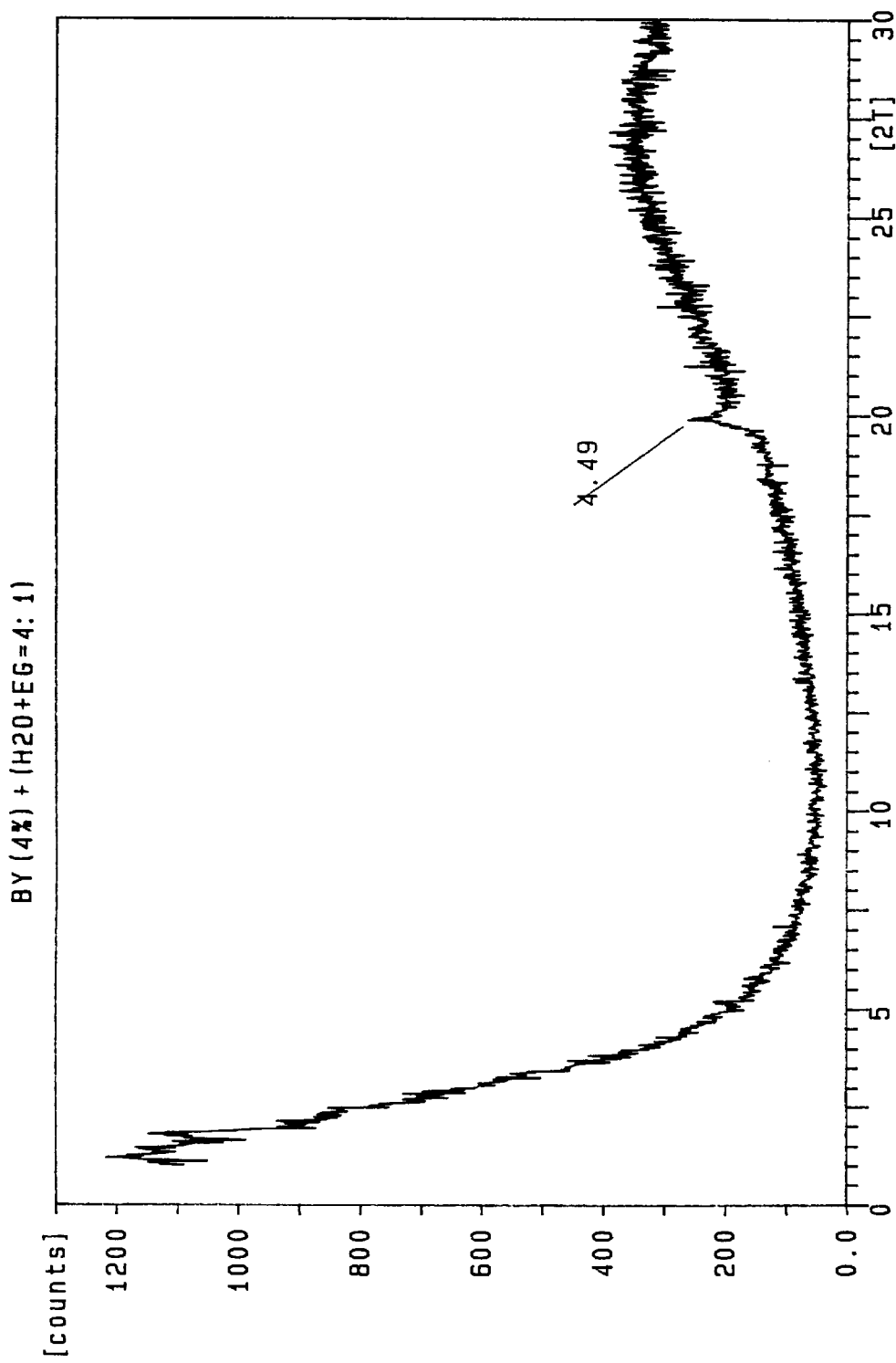
FIG. 7 is an x-ray diffraction pattern of the mixture shown in FIG. 5, after exfoliation.

The graphs of FIGS. 4 and 5 are x-ray diffraction patterns of blends of ethylene glycol and butylene glycol monomer intercalants with sodium bentonite clay (containing a crystobalite impurity. The d(001) peak of non-exfoliated (layered) sodium bentonite clay appears at about 12.5 Å, as shown in the mechanical blends of powdered sodium bentonite clay (containing about 10–12% by weight water) with powdered monomer intercalants, at various monomer intercalant loadings. When the mechanical blends were then heated to the intercalant monomer melt temperature, and preferably at least about 40–50° C. above the intercalant monomer melt temperature for faster reaction, as shown in FIGS. 6 and 7, the monomer melt was intercalated between the bentonite clay platelets, and an exothermic reaction occurred that, it is theorized, resulted from the intercalant monomer being bonded to the internal faces of the clay platelets sufficiently for exfoliation of the intercalated clay. It should be noted, also, that exfoliation did not occur unless the bentonite clay included water in an amount of at least about 5% by weight, based on the dry weight of the clay, preferably at least about 10% to about 15% water. The water can be included in the clay as received, or can be added to the clay prior to or during intercalant monomer melt or solution contact.

As shown in FIGS. 6 and 7, the melted blends no longer include a d(001) peak at about 12.5 Å (the layered clay was no longer present in the blend), but show a d(020) peak at about 4.50–4.45 Å that is representative of exfoliated, individual platelets. It should also be noted that the exfoliation occurred without shearing—the layered clay exfoliated naturally after sufficient intercalation of intercalant monomer between the platelets of the layered bentonite.

What is claimed is:

1. A method of exfoliating a phyllosilicate comprising:

contacting the phyllosilicate, having a moisture content of at least about 4% by weight, with an intercalant monomer and a carrier for said intercalant monomer, said intercalant monomer having an aromatic ring functionality, to form an intercalating composition, comprising the phyllosilicate, the intercalant monomer, and a carrier for the intercalant monomer, wherein the intercalating composition comprises at least about 2% by weight of said intercalant monomer, based on the dry weight of the phyllosilicate, to achieve intercalation of said monomer between said adjacent phyllosilicate platelets in an amount sufficient to space said adjacent phyllosilicate platelets a distance of at least about 5 Å, and to bond the intercalant monomer to a platelet surface through a bonding mechanism selected from the group consisting of ionic complexing: electrostatic complexing; chelation; hydrogen bonding; dipole/dipole; van der Waals forces; and any combination thereof without an onium ion or silane coupling agent; and separating the platelets of the intercalated phyllosilicate.

2. The method of claim 1, wherein said intercalating composition includes a water carrier comprising about 5% to about 50% by weight, based on the total weight of said intercalating composition.

3. The method of claim 2, wherein said intercalating composition comprises said phyllosilicate, said intercalant monomer and water, and said intercalating composition comprises about 10% to about 40% by weight water, based on the total weight of the intercalating composition.

4. The method in accordance with claim 1, wherein the concentration of intercalant monomer in said intercalating composition is at least about 16% by weight, based on the dry weight of the phyllosilicate.

5. The method of claim 4, wherein the concentration of intercalant monomer in said intercalating composition is in the range of about 16% to about 70% by weight, based on the dry weight of the phyllosilicate.

6. The method of claim 5, wherein the concentration of intercalant monomer in the intercalating composition is in the range of about 16% to about 60% by weight, based on the dry weight of the phyllosilicate.

7. The method of claim 6, wherein the concentration of intercalant monomer in the intercalating composition is in the range of about 35% to less than about 55% by weight, based on the dry weight of the phyllosilicate.

8. The method of claim 6, wherein the concentration of intercalant monomer in the intercalating composition is in the range of about 16% to less than about 35% by weight, based on the dry weight of the phyllosilicate.

9. The method of claim 1, wherein the concentration of intercalant monomer in said intercalating composition is in the range of about 50% to about 100% by weight, based on the dry weight of the phyllosilicate.

10. The method of claim 1, wherein the intercalate is exfoliated into a predominance of individual platelets.

11. The method of claim 1, wherein the phyllosilicate is a smectite clay.

12. The method of claim 11, wherein the smectite clay is sodium montmorillonite.

* * * * *